US012242272B2

United States Patent
Blake et al.

(10) Patent No.: US 12,242,272 B2
(45) Date of Patent: Mar. 4, 2025

(54) PATH PLANNING IN MOBILE ROBOTS

(71) Applicant: Five AI Limited, Bristol (GB)

(72) Inventors: Andrew Blake, Bristol (GB); Subramanian Ramamoorthy, Bristol (GB); Svetlin Valentinov Penkov, Bristol (GB); Majd Hawasly, Bristol (GB); Francisco Maria Girbal Eiras, Bristol (GB); Alejandro Bordallo Mico, Bristol (GB); Alexandre Oliveira E Silva, Bristol (GB)

(73) Assignee: Five AI Limited, Cambridge (GB)

( * ) Notice: Subject to any disclaimer, the term of this patent is extended or adjusted under 35 U.S.C. 154(b) by 624 days.

(21) Appl. No.: 16/976,070

(22) PCT Filed: Feb. 27, 2019

(86) PCT No.: PCT/EP2019/054911
§ 371 (c)(1),
(2) Date: Aug. 26, 2020

(87) PCT Pub. No.: WO2019/166518
PCT Pub. Date: Sep. 6, 2019

(65) Prior Publication Data
US 2022/0107646 A1    Apr. 7, 2022

(30) Foreign Application Priority Data
Feb. 28, 2018    (GB) ..................... 1803292

(51) Int. Cl.
G05D 1/00    (2024.01)
B60W 60/00    (2020.01)
G06V 20/58    (2022.01)

(52) U.S. Cl.
CPC ....... *G05D 1/0214* (2013.01); *B60W 60/0011* (2020.02); *B60W 60/0027* (2020.02);
(Continued)

(58) Field of Classification Search
None
See application file for complete search history.

(56) References Cited

U.S. PATENT DOCUMENTS

| | | | |
|---|---|---|---|
| 2005/0216181 A1* | 9/2005 | Estkowski | G08G 1/164 340/995.23 |
| 2019/0163191 A1* | 5/2019 | Sorin | G06F 16/9024 |
| 2019/0234751 A1* | 8/2019 | Takhirov | G01C 21/3626 |

FOREIGN PATENT DOCUMENTS

| | | |
|---|---|---|
| EP | 1733287 B1 | 1/2010 |
| WO | 2017/002590 A1 | 1/2017 |

OTHER PUBLICATIONS

Aoude et al., "Probabilistically safe motion planning to avoid dynamic obstacles with uncertain motion patterns", Autonomous Robots Journal, 2013, pp. 51-76 (Year: 2013).*

(Continued)

*Primary Examiner* — Tamara L Weber
(74) *Attorney, Agent, or Firm* — Andrew J. Tibbetts; Samuel S. Stone; Greenberg Traurig, LLP

(57) ABSTRACT

A computer-implemented method of planning a path for a mobile robot in the presence of a set of obstacles comprises: computing for each obstacle a probabilistic obstacle position distribution; computing at least one path-independent function as a combination of the probabilistic obstacle position distributions; and for at least one candidate path, determining an upper bound on the total probability of obstacle collision along that path, by aggregating the path-independent function based on an area defined by the candidate path and a mobile robot shape, wherein the path-independent function is independent of the candidate path.

16 Claims, 21 Drawing Sheets

(52) U.S. Cl.
CPC ......... *G05D 1/0238* (2013.01); *G05D 1/0253* (2013.01); *G06V 20/58* (2022.01); *B60W 2554/4042* (2020.02); *B60W 2554/4043* (2020.02)

(56) References Cited

OTHER PUBLICATIONS

Schmerling et al., "Evaluating Trajectory Collision Probability through Adaptive Importance Sampling for Safe Motion Planning", Stanford University, 2017 (Year: 2017).*
Althoff et al., Model-based probabilistic collision detection in autonomous driving. IEEE Transactions on Intelligent Transportation Systems. Apr. 28, 2009;10(2):1-11.
Axelrod et al., Provably safe robot navigation with obstacle uncertainty. The International Journal of Robotics Research. Dec. 2018;37(13-14):1760-74.
Behar et al., Extracting the Minkowski sum boundary from the reduced convolution. 20th Annual Fall Workshop on Computational Geometry. Oct. 2010:4 pages.
Bevilacqua et al., Reactive planning for assistive robots. IEEE Robotics and Automation Letters. Apr. 2018;3(2):1276-83.
Coue et al., Bayesian occupancy filtering for multitarget tracking: an automotive application. The International Journal of Robotics Research. Jan. 2006;25(1):19-30.
Gal et al., Dropout as a bayesian approximation: Representing model uncertainty in deep learning. International conference on machine learning, PMLR. Jun. 11, 2016:1050-1059.
Kalra et al., Driving to Safety. Rand corporation Report RR1478. 2016:1-15.
Katrakazas et al., Real-time motion planning methods for autonomous on-road driving: State-of-the-art and future research directions. Transportation Research Part C: Emerging Technologies. Nov. 1, 2015;60:416-42.
Kim et al., A novel algorithm for crash detection under general road scenes using crash probabilities and an interactive multiple model particle filter. IEEE Transactions on Intelligent Transportation Systems. Dec. 2014;15(6):2480-90.
Lambert et al., Collision probability assessment for speed control. 2008 11th IEEE Conference on Intelligent Transportation Systems. Oct. 12, 2008:1043-1048.
Lavalle, Rapidly-exploring random trees: A new tool for path planning. Tech Rep. 1998:1-4.
Okuta et al., CuPy: A NumPy-compatible library for NVIDIA GPU calculations. 31st conference on neural information processing systems. Dec. 2017:1-7.
Rios-Martinez et al., Understanding human interaction for probabilistic autonomous navigation using Risk-RRT approach. 2011 IEEE/RSJ International Conference on Intelligent Robots and Systems. Sep. 25, 2011:2014-2019.
Shalev-Shwartz et al., On a formal model of safe and scalable self-driving cars. ArXiv preprint arXiv:1708.06374v6. Oct. 27, 2018;6:1-37.
Trautman et al., Robot navigation in dense human crowds: Statistical models and experimental studies of human-robot cooperation. The International Journal of Robotics Research. Mar. 2015;34(3):335-56.
Urmson et al., Approaches for heuristically biasing RRT growth. Proceedings 2003 IEEE/RSJ International Conference on Intelligent Robots and Systems (IROS 2003). Oct. 27, 2003;2:1178-1183.
Wein, Exact and efficient construction of planar Minkowski sums using the convolution method. European symposium on algorithms. Sep. 11, 2006:1-12.
Zhang et al., How far are we from solving pedestrian detection?. Proceedings of the IEEE conference on computer vision and pattern recognition 2016:1259-1267.
Zhang et al., Towards reaching human performance in pedestrian detection. IEEE transactions on pattern analysis and machine intelligence. Apr. 2018;40(4):973-86.
Ziegler et al., Fast collision checking for intelligent vehicle motion planning. 2010 IEEE intelligent vehicles symposium. Jun. 21, 2010:518-522.
PCT/EP2019/054911, Aug. 20, 2019, International Search Report and Written Opinion.
PCT/EP2019/054911, Jun. 25, 2019, Invitation to Pay Additional Fees.
International Search Report and Written Opinion for International Application No. PCT/EP2019/054911 mailed Aug. 20, 2019.
Invitation to Pay Additional Fees for International Application No. PCT/EP2019/054911 mailed Jun. 25, 2019.
Guibas et al., Bounded uncertainty roadmaps for path planning. Springer, Proceedings 2008 International Workshop on the Algorithmic foundations of robotics VIII. Jan. 1, 2009:199-215.
Kuwata et al., Real-time motion planning with applications to autonomous urban driving. IEEE Transactions on control systems technology. Jul. 28, 2009;17(5):1105-18.
Missiuro et al., Adapting probabilistic roadmaps to handle uncertain maps. Proceedings 2006 IEEE International Conference on Robotics and Automation, 2006. ICRA 2006. May 15, 2006:1261-1267.
Fulgenzi, Chiara, et al. "Probabilistic navigation in dynamic environment using Rapidly-exploring Random Trees and Gaussian Processes." 2008 IEEE/RSJ International Conference on Intelligent Robots and Systems. IEEE, 2008. (Year: 2008).
Fulgenzi et al., "Risk based motion planning and navigation in uncertain dynamic environment." HAL. Oct. 19, 2010: p. 1-14.
Miura, Jun, Uozumi, Hiroshi, and Shirai, Yoshiaki; "Mobile Robot Motion Planning Considering the Motion Uncertainty of Moving Obstacles." IEEE SMC'99 Conference Proceedings. 1999 IEEE International Conference on Systems, Man, and Cybernetics (Cat. No. 99CH37028). vol. 4. IEEE, 1999. (Year: 1999).
Miura, Jun and Shirai, Yoshiaki; "Modeling Motion Uncertainty of Moving Obstacles for Robot Motion Planning," Proceedings 2000 ICRA. Millennium Conference. IEEE International Conference on Robotics and Automation. Symposia Proceedings (Cat. No.00CH37065), pp. 2258-2263 vol. 3, doi: 10.1109/ROBOT.2000.84636 (Year: 2000).
Office Action dated Jan. 3, 2024, from related European Patent Application No. 19708290.2 (7 pages).

* cited by examiner $\partial \Pi = \partial \Pi_{side} \cup \partial \Pi_{end}$

PATH PLANNING IN MOBILE ROBOTS

RELATED APPLICATIONS

This application is a national stage filing under 35 U.S.C. § 371 of international application number PCT/EP2019/054911, filed Feb. 27, 2019, which claims the benefit of British application number 1803292.0, filed Feb. 28, 2018.

TECHNICAL FIELD

This disclosure relates to path planning in mobile robots such as autonomous vehicles (AVs).

BACKGROUND

Mobile robotic systems that can autonomously plan their paths in complex environments are becoming increasingly more prevalent. An example of such a rapidly emerging technology is autonomous vehicles that can navigate by themselves on urban roads. Such vehicles must not only perform complex manoeuvres among people and other vehicles, but they must often do so while guaranteeing stringent constraints on the probability of adverse events occurring, such as collision with these other agents in the environments. In one study, it is estimated that publicly deployable autonomous vehicles must achieve less than 1 collision in hundreds of millions of miles driven in order for their maximum failure rates to be established as acceptable.

An autonomous vehicle, also known as a self-driving vehicle, refers to a vehicle which has a sensor system for monitoring its external environment and a control system that is capable of making and implementing driving decisions automatically using those sensors. This includes in particular the ability to automatically adapt the vehicle's speed and direction of travel based on inputs from the sensor system. A fully autonomous or "driverless" vehicle has sufficient decision-making capability to operate without any input from a human driver. However the term autonomous vehicle as used herein also applies to semi-autonomous vehicles, which have more limited autonomous decision-making capability and therefore still require a degree of oversight from a human driver.

Other mobile robots are being developed, for example for carrying freight supplies in internal and external industrial zones. Such mobile robots would have no people on board. Autonomous air mobile robots (drones) are also being developed. The sensory input available to such a mobile robot can often be noisy. Typically, the environment is perceived through sensors such as based on stereo vision or LiDAR, requiring not only signal processing for smoothing or noise removal, but also more complex "object finding" algorithms, such as for the drivable surface or other agents in the environment.

Uncertainty arises directly from sensor noise, and then indirectly through perception algorithms that detect discrete obstacles or impassable terrain.

The issue of safety in control and motion planning has been investigated from a number of different methodological directions.

In early attempts within the robotics community, treatment of safety was closely associated with the notions of robustness to modelling errors in control theory. In the context of feedback control design, the robust control theory provides techniques to determine the single controller that can simultaneously guarantee a desired performance level for a family of possible target system models. This basic notion can be extended to the case of hybrid nonlinear dynamical systems and optimal control specifications through the concept of reachable sets, which can be computed using techniques such as level set methods. Recent extensions have included the use of Gaussian Process based learning of a robot's internal dynamics model, to enable such reachability computations with physical robots.

Other current approaches consider safety in the context of human-robot interaction, where one is also interested in considerations such as modulating physical forces and human factors associated with the psychology of interaction. The core question of avoiding collision states in motion planning is dealt with in these works through the definition of safe zones and operating envelopes, which are not unlike the reachable sets mentioned above. In many applications, the resulting solutions may be overly conservative—leading to 'frozen robots'. In work drawing on robust optimization and stochastic programming, some researchers have posed the problem of motion planning as one of chance-constrained optimization. Following the above mentioned approaches to robust control, these works use set-bounded models of uncertainty and pose the search for paths as a problem of convex programming. In another recent example, the authors calculate rectangular bounds associated with uncertainty in location of obstacles, to determine the safe space within which RRT (Rapidly Exploring Random Tree) style algorithms can operate. As discussed later, the approach described in the present disclosure will improve upon these computations, particularly in the case of close interactions in tight spaces—such as in urban driving.

Reference is made to papers authored by Christian Laugier, Jorge Rios-Martinez and Anne Spalanzani, who calculate probabilistic risk of collision of mobile robots and utilise this to define a risk guided search such as the Risk-RRT. In a paper entitled "*Understanding human interaction for probabilistic autonomous navigation using Risk-RRT approach*, (IEEE Int. Conf. IROS, 2011.) Laugier et al show that, in the context of posing environmental uncertainty in occupancy grids, integrals over multiple grids, one per obstacle, can be combined non-linearly to compute the total risk of collision.

State of the art object detection algorithms tend to be based on methods that imply a limit on the achievable accuracy and reliability of detections. It is realistic to expect such perception modules to be able to provide a probability distribution over poses of each detected object in the scene. Achieving safe motion planning in such a setting requires the motion planning methods to take into account the probability of unsafe events (such as a collision of the robot with another agent), providing at least approximate assurance regarding the (non-)occurrence of these events.

SUMMARY

The core problem addressed herein is that of safe and computationally efficient motion planning in an imprecisely known environment. In some embodiments, the method receives as input detection of objects in the environment along with probability distributions over pose, such as over their centroid position when the shape model is known. This defines the space within which paths are searched. The first step is to determine the probability of a collision event occurring (i.e., the spatial extent of the robot and the spatial extent of any obstacle having an overlap) along any given path. This core computation may then be used to modify a variety of motion synthesis methods. For instance, the Rapidly Exploring Random Tree algorithm can utilise this probability within the search process. Likewise, a variational formulation of optimal control could include this within the cost term.

In order to navigate an encountered driving scenario safely and effectively, an autonomous vehicle planner needs to be able to plan paths which can enable collision free behaviour or at least determine an upper bound on collision risk. One context of path planning is to implement a manoeuvre in a sequence of manoeuvres which have been determined to be executed in an encountered scenario. The manoeuvre may be implemented by one of a number of candidate paths (or trajectories). The techniques described herein can be used to calculate a bound on the probability of collision which can be used to stratify candidate trajectories according to their degree of risk. Then, within a user-defined threshold for an acceptable level of primary risk, motion synthesis techniques could optimise for secondary criteria such as comfort and efficiency.

In a first aspect of the present invention, a computational speed-up is achieved through the use of a path-independent function ("accumulator"), which accumulates obstacle location probability distributions over multiple objects. As explained below, the use of an accumulator allows computational work to be re-used when evaluating collision risk for different candidate paths, such that the computational complexity algorithm scales as O(N+K), rather than O(NK), where N is the number of candidate paths considered and K is the number of obstacles.

The first aspect provides a computer-implemented method of planning a path for a mobile robot in the presence of a set of obstacles, the method comprising: computing for each obstacle a probabilistic obstacle position distribution; computing at least one path-independent function as a combination of the probabilistic obstacle position distributions; and for at least one candidate path, determining an upper bound on the total probability of obstacle collision along that path, by aggregating the path-independent function based on an area defined by the candidate path and a mobile robot shape, wherein the path-independent function is independent of the candidate path.

The terms probabilistic obstacle position distribution and probabilistic obstacle position function may be used interchangeably herein to refer to a probability distribution over possible obstacle locations. In the following description, this is in the form of a density function representing the (probabilistic) position of an obstacle.

It is noted that the term area in the present context refers generally to a region (subset) of the space in which candidate paths are evaluated (free space F of "collision space" below), i.e. the area refers generally to a subset of F. Both a two-dimensional freespace, i.e. $F \subset \mathcal{R}^2$ and freespace in the form of a three-dimensional spacetime volume, i.e. $f \subset \mathcal{R}^3$, are considered in the following examples.

In embodiments, for each of a plurality of candidate paths, an upper bound on the total probability of obstacle collision along that path is may be, by aggregating the path-independent function based on an area defined by that candidate path and the mobile robot shape, wherein the upper bound is computed for each candidate path without recomputing the path-independent function.

The upper bound for the or each candidate path may be an upper bound on the sum of individual obstacle collision probabilities along that path, but may be computed without determining any of the individual obstacle collision probabilities, and instead by aggregating the path-independent function over the defined area for that path.

The defined area over which the path-independent function is aggregated may be a swept area defined in two-dimensional space by the candidate path and the mobile robot shape. This may be referred to herein as a "tethered" obstacle approach.

Alternatively, the defined area may be a surface of a spacetime tube defined by the candidate path and the mobile robot shape, and the path-independent function may be integrated or otherwise aggregated over that surface. This may be referred to herein as a "dynamic" obstacle approach.

The term "defined by the candidate path and the mobile robot shape" in the present context means the area is determined based on at least the candidate path and the mobile robot shape. For example, the defined area may be defined by the candidate path, the mobile robot shape and an obstacle shape ($B_k$).

For example, the spacetime tube may be defined by the candidate path and an expanded mobile robot shape, the expanded mobile robot shape being defined by the mobile robot shape and an obstacle shape. The total probability of obstacle collision for each candidate path may, in that event, be a total probability of obstacle collision between a first time and a second time, and the probabilistic obstacle position distributions may be computed for that second time.

The path-independent function may be aggregated based on the defined area by integrating it over the defined area.

For example, in the tethered obstacle approach, the path-independent function may be determined as $$G = \Sigma_k \lambda_k I_{B_k} * p_k$$

where $$A_k = \frac{1}{\text{area}(B_k)},$$

$I_{B_k}$ is the indicator function of a shape $B_k$ of the obstacle k and $p_k$ is the probabilistic obstacle position distribution for the obstacle k; and the path-independent function G may be aggregated as $$\int I_A(r) G(r)$$

where $I_A$ is the indicator function for the swept area A.

As another example, in the dynamic obstacle approach, the path-independent function may be integrated over the surface of the spacetime tube as noted above.

The path-independent function may be aggregated based on the defined area by integrating it around a bounding contour of the defined area.

For example, in the tethered obstacle approach, the path-independent function may be determined as $$G_\sigma = \tfrac{1}{2} \Sigma_k \partial B_{k,\sigma} * p_k$$

where $\partial B_{k,\sigma}$ is a delta-function ridge along a bounding contour of a shape $B_k$ of the obstacle k and $p_k$ is the probabilistic obstacle position distribution for the obstacle k; and the path-independent function $G_\sigma$ may be aggregated as $$\int \partial A_\sigma(r) G_\sigma(r)$$

where $\partial A_\sigma$ is the bounding contour of the swept area A and $\partial A_\sigma(x)$ approximates a delta-function ridge along that contour.

For example, a first path-independent function may be determined as G and a second path-independent function may be determined as G, and wherein the path independent functions may be aggregated as follows in order to determine the upper bound:

$$\int \partial A_\alpha(r) G_\alpha(r) + I_A(r) G(r).$$

The upper bound may be computed for the or each path as an integral of the product of the path-independent function (e.g. G, $G_\alpha$) and a path-dependent function (e.g. $I_A$, $\partial A_\alpha$) depending on the swept area of that path, thereby aggregating the path-independent function over the defined area.

The path-independent function may be aggregated by summing values of the path-independent function over the defined area.

For example, in the spacetime tube case referred to above, the spacetime tube may be determined as a set of spacetime voxels, wherein the path-independent function may be determined by projecting faces of the voxels into a spacetime plane for each obstacle and integrating the probabilistic obstacle position distribution for that obstacle over each projection of the voxel face for that obstacle to compute a probability value for that voxel face, and wherein the path-independent function may be aggregated over the surface of the spacetime tube by summing the probability values computed for the voxel faces.

A second aspect of the present invention is the dynamic obstacle approach, which allows collision risk to be evaluated probabilistically for dynamic obstacles, i.e. which may be moving within a time interval under consideration.

The second aspect provides a computer-implemented method of planning a path for a mobile robot in the presence of at least one obstacle, the method comprising: determining projections, onto a second spacetime plane, of points or regions within a spacetime volume based on position information for the obstacle at a first time and a predicted set of obstacle trajectories, the first time defining a first spacetime plane separated from the second spacetime plane by the spacetime volume; determining at least one candidate path for the mobile robot as a spacetime tube having a side-surface lying within the spacetime volume and extending from the first spacetime plane to the second spacetime plane, wherein at least some of said points or regions lie on the side-surface of the spacetime tube; and estimating for the candidate path a risk of collision, between the first and second times, based on a probabilistic obstacle position distribution for the obstacle, as applied to the projections of the side-surface points or regions.

In embodiments, projections of points or regions within the spacetime volume, onto the second spacetime plane, may be determined for each of multiple obstacles based on the predicted set of obstacle trajectories and position information for that obstacle at the first time. The risk of collision may be estimated for the candidate path based on a probabilistic obstacle position distribution $p_k$ for each obstacle k, as applied to the projections of points or regions on the side-surface of the spacetime tube as determined for that obstacle.

Multiple candidate paths may be determined as corresponding spacetime tubes, each having a side-surface lying within the spacetime volume and extending from the first spacetime plane to the second spacetime plane, and a risk of collision may be estimated as above for each candidate path.

A path-independent function may be computed at each of the points or regions within the spacetime volume based on the probabilistic obstacle position distribution for each obstacle, as applied to the projection of that point or region determined for that obstacle.

The risk of collision between the first and second times may be computed for each of the candidate paths based on the path-independent function as computed at points or regions on the surface of the corresponding spacetime tube, wherein the path-independent function is independent of the candidate paths and the risk of collision is estimated for each candidate path without recomputing the path-independent function.

Alternatively, a projection of the side-surface of the or each spacetime tube, onto the second spacetime plane, may be determined for the or each obstacle based on the predicted set of obstacle trajectories and the position information for that obstacle at the first time, and the risk of collision may be estimated for the or each spacetime tube by computing an integral of the probabilistic obstacle position distribution for the or each obstacle over the projection of the side-surface of that spacetime tube determined for that obstacle.

The position information may comprise a spacetime reference point in the first spacetime plane for the or each obstacle, wherein the projection of each point for that obstacle may be the intersection of an obstacle trajectory in the predicted set of obstacle trajectories with the spacetime plane, the obstacle trajectory extending from the spacetime reference point for that obstacle through that point to the second spacetime plane.

The predicted set of obstacle trajectories may be a set of rays in spacetime, whereby the or each obstacle is assumed to move at constant velocity between the first and second times. Alternatively, at least one of the obstacle trajectories in the predicted set of obstacle trajectories may be a trajectory of non-zero acceleration between the first and second times.

The or each spacetime tube may be defined by a mobile robot shape.

The or each spacetime tube may be an expanded spacetime tube defined by the mobile robot shape and an obstacle shape.

The risk of collision may be computed based additionally on the or each probabilistic obstacle position distribution as applied to a top-surface of the spacetime tube lying in the second spacetime plane.

The risk of collision may be estimated for the or each candidate path based on an integral of the path-independent function computed over the side-surface of the spacetime tube.

The path-independent function may be a path-independent obstacle tensor field F computed as:

$$F(r, t) = \sum_k F_k(r, t),$$

wherein $F_k(r,t)$ is a tensor component for obstacle k computed based on $p_k(r_k',T)$, i.e. the probabilistic obstacle position distribution $p_k$ for obstacle k as applied to the projection $(r'_k,T)$ of the point $(r,t)$ on the second spacetime plane $t=T$, T being the second time.

The path-independent obstacle tensor field may be integrated over the side-surface $\partial \Pi_{side}$ of the spacetime tube as:

$$\int_{\partial \Pi_{side}} F(r,t) G(n)^T$$

G(n) being a tensor-valued function of n, and $n=n(r,t)$ being a normal to the side-surface $\partial \Pi_{side}$ of the spacetime tube at the point $(r,t)$ on the side-surface $\partial \Pi_{side}$.

In this context, the following may hold:

$$F_k(r,t) = f_k(r,t)\Phi(\hat{R}_k),$$

$$G(n)^T = D\Phi(n)^T,$$

wherein D is a diagonal matrix, $\Phi$ is a tensor-valued function, $f_k(r,t)$ is a scalar which depends on $p_k(r_k',T)$, and $\hat{R}_k = \hat{R}_k(r,t)$ denotes a direction in spacetime of the obstacle trajectory extending from the spacetime reference point $(r_k, 0)$ for obstacle k through the point (r,t) to intersect the second spacetime plane t=T at the point $(r_k',T)$.

Further, the following may also hold:

$$pos(e \cdot n) \le \phi(e)D\phi(n)^T,$$

$$pos(u) = \begin{cases} u & \text{for } u > 0 \\ 0 & \text{otherwise} \end{cases}.$$

For example:

$$\phi(e) = (1, e_x, e_y, e_t, e_x^2, e_y^2, e_t^2, e_x e_y, e_x e_t, e_y e_t),$$

$$D = \text{diag}(1/4, 1/2, 1/2, 1/2, 1/4, 1/4, 1/4, 1/2, 1/2, 1/2).$$

For example:

$$f_k(r,t) = \frac{T}{t}\left(\frac{1}{\hat{R}_k \cdot \hat{t}}\right) p_k(r_k', T),$$

$$\hat{R}_k = \frac{(r,t) - (r_k, 0)}{|(r,t) - (r_k, 0)|},$$

$$r_k' = r_k + (r - r_k)\frac{T}{t}$$

$\hat{t}$ being a normal to the second spacetime plane t=T.

The risk of collision may be estimated based additionally on a second integral computed over a top-surface of the spacetime tube which lies within the second spacetime plane.

For example, the second integral may be an integral of a second path-independent function, the second path-independent function being computed based on the probabilistic obstacle position distribution for each obstacle as applied to the top-surface of the spacetime tube.

The second path-independent function may be computed as:

$$p(r,T) = \sum_k p_k(r,T)$$

wherein the second integral over the top-surface $\partial \Pi_{top}$ may be computed as:

$$\int_{\partial \Pi_{top}} p(r,T).$$

The spacetime tube may be determined as a subset of a set of predefined voxels within the spacetime volume, the side-surface being defined by a set of voxel faces.

The regions projected onto the second spacetime plane may be faces of voxels in the predefined set of voxels.

A probability value may be determined for each of the projected voxel faces by integrating the probabilistic obstacle position distribution over the projection of that voxel face.

For example, a probability value may be determined for each voxel face c for each obstacle k, by integrating the probabilistic obstacle position distribution for that obstacle $p_k$ over the projection of that voxel face for that obstacle $\psi_k(c)$.

The above path independent function may be computed at each voxel face by combining the probability values computed for that voxel face for the multiple obstacles.

For example, the path-independent function may be computed as:

$$q(c,v) = \sum_k q_k(c,v)$$

$$q_k(c,v) = \begin{cases} \int_{(r,T) \in \psi_k(c)} p_k(r,T) & \text{if } (R_c - R_k) \cdot vn_c \ge 0 \\ 0 & \text{otherwise} \end{cases}$$

in which $R_c$ is a spacetime point on voxel face c, $R_k = (r_k, 0)$ is the spacetime reference point for obstacle k, $n_c$ denotes a direction normal to voxel face c and $v = v(c, \partial \Pi) = \pm 1$ denotes the direction of the outward normal from the space time volume H at voxel face c.

The risk of collision may be estimated by computing:

$$\sum_{c \in \partial \Pi_{side}} q(c, v(c, \partial \Pi))$$

in which $\partial \Pi_{side}$ denotes the set of voxel faces which define the side surface.

For example, the risk of collision may be estimated as:

$$\sum_{c \in \partial \Pi} q(c, v(c, \partial \Pi))$$

in which $\partial \Pi = \partial \Pi_{side} \cup \partial \Pi_{top}$, $\Pi_{top}$ is a set of voxel faces which form a top-surface of the spacetime tube lying in the second spacetime plane t=T, where $\psi_k(c) = c$ for each and v=1 for each $c \in \partial \Pi_{top}$.

To achieve a further computational speed-up, a set of common voxel face projections may be determined by projecting the voxel faces onto the second spacetime plane based on common position information, wherein the voxel face projections may be determined for the or each obstacle by transforming the common voxel face projections based on the position information for that obstacle.

The risk of collision may be estimated for the or each candidate path as an upper bound:

$$f_D = \sum_k P_D(k)$$

in which:

$$P_D(k) = \int_{A_k'} p_k(r,T)$$

in which $A'_k$ denotes the projection of the corresponding spacetime tube onto the second spacetime plane t=T based on the predicted set of obstacle trajectories and the position information for obstacle k.

The upper bound may be computed for each candidate path without computing any $P_D(k)$, and is instead computed based on the above path-independent function as computed at the points or regions on the surface of the corresponding spacetime tube.

The upper bound may be computed for the or each candidate path by computing $P_D(k)$ for each candidate path and each obstacle k.

In embodiments of any of the above-referred to aspects, in the case that a risk of collision (e.g. upper bound on the total collision probability) is computed for each of multiple candidate paths, the upper bound or risk of collision may be provided for each candidate path as a safety parameter and the method comprises the step of ranking the paths in the order of safety parameter to enable selection of one of the candidate paths from the ranked paths.

For example, a path having the smallest upper bound or risk of collision is selected for navigating the mobile robot through the obstacles.

Alternatively, a subset of paths that meet a minimum safety threshold may be selected from the candidate paths (e.g. from the ranked paths, in the case that the paths are ranked) that have been evaluated, and then an operating path may be selected from the remaining paths which meet the safety threshold to optimize other factor(s) such as comfort, efficiency etc.

The operating path refers to the path that is actually selected for the mobile robot to traverse.

All of the candidate paths may be from a common start point to a common endpoint.

The upper bound or the risk of collision may be provided as a safety parameter, and the method may comprise the steps of receiving a threshold for safety and deselecting any of the candidate paths which do not satisfy the threshold for safety.

The method may comprise receiving a path selection parameter and using the received path selection parameter to select an operating path from the paths which have not been deselected.

The path selection parameter may comprise at least one of comfort and efficiency.

The method may comprise identifying the presence of the or each obstacle by at least one sensor on the robot while mobile in its environment by capturing images and recognising obstacles in the images according to different object recognition classes based on accuracy of recognition.

The threshold for safety may be attained by a selected operating path for all object recognition classes of objects captured in the images.

The path-independent function may depend on a determined (e.g. assumed or modelled) shape of the or each obstacle.

The obstacle shape may be determined by accessing a shape model for the obstacle.

The or each obstacle may be identified using a perception module based on sensory input available to the mobile robot while mobile in its environment, or simulated sensory input.

A further aspect disclosed herein provides a computer-implemented method of planning a path for a mobile robot in the presence of a set of obstacles, each of the obstacles having a density function representing the probabilistic position of the obstacle; computing at least one path-independent function as a combination of the density functions for the obstacles; and for at least one candidate path, determining an upper bound on the total probability of obstacle collision along that path, by aggregating the path-independent function based on an area defined by the candidate path and a mobile robot shape, wherein the path-independent function is independent of the candidate path.

In another aspect, a computer-implemented method of planning a path for a mobile robot in the presence of a set of obstacles comprises: computing for each obstacle a probabilistic obstacle position distribution; computing at least one path-independent function as a combination of the probabilistic obstacle position distributions; and for at least one candidate path, determining an upper bound on the total probability of obstacle collision along that path, by integrating the path-independent function over an area defined by the candidate path and a mobile robot shape, wherein the path-independent function is independent of the candidate path.

A data processing system configured to plan a path for a mobile robot and comprising a computer and memory holding computer code which when executed by the computer carries out any of the above methods.

The data processing system may be embodied in a simulator.

The data processing system may be on board a mobile robot.

In the following, the risk of collision/upper bound may be evaluated using either the dynamic or tethered obstacle approach for example.

A further aspect provides a computer implemented method of planning a path for a mobile robot in the presence of K obstacles where K is at least one, the method comprising: determining a set of candidate paths, all candidate paths being from a common start point to a common end point; providing for each candidate path an upper bound on the total probability of at least one collision (or estimated risk of collision) between the mobile robot and the K obstacles as a safety parameter; and ranking the candidate paths in order of the safety parameter to enable selection of one of the candidate paths from the ranked paths.

In embodiments, the method may comprise receiving a threshold for safety and deselecting the ranked candidate paths which do not satisfy the threshold for safety.

The method may comprise receiving a path selection parameter and using the received path selection parameter to select an operating path from the ranked paths which have not been deselected.

The method may comprise identifying the presence of K obstacles by at least one sensor on the robot while mobile in its environment by capturing images and recognising obstacles in the images according to different object recognition classes based on accuracy of recognition.

The threshold for safety may be attained by a selected operating path for all object recognition classes of objects captured in the images.

A further aspect of this disclosure provides a computer implemented method of planning a path for a mobile robot in the presence of K obstacles where K is at least one, the method comprising: determining a set of candidate paths, all candidate paths being from a common start point to a common end point; receiving a threshold for safety and deselecting candidate paths of the set which do not satisfy the threshold for safety; and using a path selection parameters to select an operating path from the candidate paths which have not been deselected.

The method may comprise the step of providing for each candidate path in the set an upper bound on the total probability of at least one collision (or estimated risk of collision) between the robot and the K obstacles as a safety parameter, and using the safety parameter in comparison with the threshold for safety for deselecting candidate paths.

The the path selection parameter may comprise at least one of comfort and efficiency.

Further aspects provide a data processing system configured to plan a path for a mobile robot and comprising a computer and memory holding computer code which when executed by the computer carries out any of the above methods; and a computer program product comprising instructions which, when executed by a computer, cause the computer to carry out the method of any preceding method.

The data processing system may be embodied in a simulator external to, or on board the mobile robot.

A further aspect provides an autonomous vehicle or other mobile robot comprising: a drive mechanism; and the data processing system referred to above for planning a path for the mobile robot, the computer system being coupled to the drive mechanism for controlling the mobile robot to traverse the planned path (e.g. the above operating path).

Further aspects provide a computer-readable storage medium comprising instructions which, when executed by a computer, cause the computer to carry out any of the above methods. A computer-readable data carrier may have stored thereon the computer program product, in a further aspect. A further aspect provides a data carrier signal carrying the computer program product.

BRIEF DESCRIPTION OF FIGURES

For a better understanding of the present invention, and to show how embodiments of the same may be carried into effect, reference is made to the following Figures by way of non-limiting example in which.

DETAILED DESCRIPTION

As mobile robots and autonomous vehicles become increasingly prevalent in human centred environments, there is a need to develop techniques which seek to guarantee collision free behaviour, or at least bound the risk. Perceptual modules which receive sensory input data provide only noisy estimates of objects and it is appropriate to represent the environment probabilistically. Embodiments of the present invention introduce methods of path planning which enable a number of candidate paths to be ranked according to a safety parameter. A Fast Path Risk brackets (FPR) algorithm is described herein which efficiently calculates a bound on the probability of collision which can be used to stratify candidate trajectories according to their degree of risk. Then, within the user-defined threshold for an acceptable level of primary risk, motion synthetic techniques might be utilised to optimise for secondary criteria such as comfort or efficiency.

Embodiments of the present invention provide a number of different novel and useful aspects. One contribution is the use in the FPR algorithm of a 'convolution trick' to factor integrals which are used to compute the bound on the collision risk. As a result, given K obstacles and N candidate paths, the computational load is reduced to O (N+K) compared with conventional techniques at O (NK). According to another aspect, candidate paths may be ranked in order of safety based on the upper bound on the total probability of at least one collision between the robot and K obstacles.

According to another aspect, candidate paths may be filtered (e.g. deselected) on the basis of a user-defined threshold, and then a path selected based on other parameters (for example comfort and efficiency) from the filtered (non-deselected) set.

Example embodiments of the present invention are described in detail below. First some useful context to the invention is described.

Figure 25:
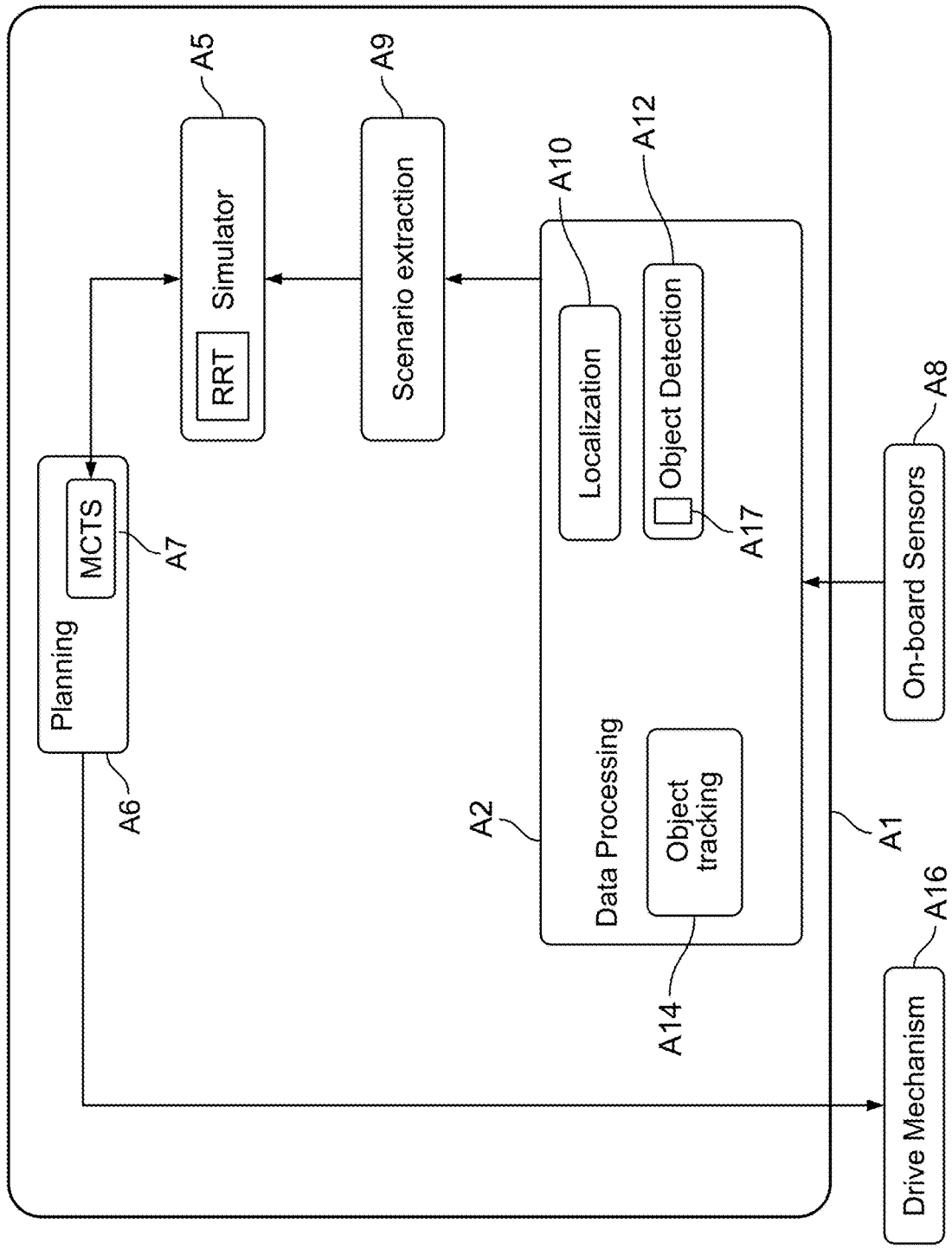
FIG. 25 is a schematic block diagram of an on-board control system for an AV.

FIG. 25 shows a highly schematic functional block diagram of certain functional components embodied in an on-board computer system A1 of an AV (ego vehicle), namely a data processing component A2, simulation component A5 and an AV planner A6. The AV is given as a non-limiting example of a mobile robot.

The data processing component A2 receives sensory input in the form of sensor data from an on-board sensor system A8 of the AV. The on-board sensor system A8 can take different forms but generally comprises a variety of sensors such as image capture devices (cameras), LiDAR units etc., satellite-positioning sensor(s) (GPS etc.), motion sensor(s) (accelerometers, gyroscopes etc.) etc., which collectively provide rich sensor data from which it is possible to extract detailed information about the surrounding environment and the state of the AV and other actors (vehicles, pedestrians etc.) within that environment.

Note however that the present-techniques are not limited to using image data and the like captured using on-board optical sensors (image capture devices, LiDAR etc.) of the AV itself. The method can alternatively or additionally be applied using externally-captured sensor data, for example CCTV images etc. captured by external image capture units in the vicinity of the AV. In that case, at least some of the sensor inputs used to implement the method may be received by the AV from external sensor data sources via one or more wireless communication links. Moreover, the techniques described herein can be implemented off-board, that is in a computer system such as a simulator which is to execute path planning for modelling or experimental purposes. In that case, the sensory data may be taken from computer programs running as part of a simulation stack. In either context, a perception module A17 may operate on the sensor data to identify objects, as part of the data processing system A2.

The data processing system A2 processes the sensor data in order to extract such information therefrom. This will generally involve various forms of machine learning (ML)/ artificial intelligence (AI) processing. Functions of the data processing system A2 that are relevant in the present context include localization (block A10) and object detection (block A12). Localization is performed to provide awareness of the surrounding environment and the AV's location within it. A variety of localization techniques may be used to this end, including visual and map-based localization. By way of example, reference is made to United Kingdom patent Application No. 1812658.1 entitled "Vehicle Localization", which is incorporated herein by reference in its entirety.

Object detection is applied to the sensor data to detect and localize external objects within the environment such as vehicles, pedestrians and other external actors which may contribute obstacles to the AV. This may for example comprise a form of 3D bounding box detection, wherein a location, orientation and size of objects within the environment and/or relative to the ego vehicle is estimated. This can for example be applied to (3D) image data such as RGBD (red green blue depth), LiDAR point cloud etc. This allows the location and other physical properties of such external actors to be determined on the map. Object detection may be carried out using a perceptual model in a perception module A17. In an on-board context, the perceptual model utilises the received sensor data. In an off-board context the perceptual model may utilise data derived from actual or simulated sensors, pre-stored or generated by a computer program. Perceptual models and their limitations are discussed later.

The AV planner A6 uses the extracted information about the ego's surrounding environment and the external agents within it as a basis for planning path for the AV. The AV planner A6 makes various high-level decisions and then increasingly lower-level decisions that are needed to implement the higher-level decisions. The end result is a series of real-time, low level action decisions. In order to implement those decisions, the AV planner A6 generates control signals, which are input, at least in part, to a drive mechanism A16 of the AV, in order to control the speed and heading of the vehicle (e.g. though steering, breaking, accelerating, changing gear) etc. Control signals are also generated to execute secondary actions such as signalling.

Similar control signals may be generated in an off-board simulators and supplied to computer programs implementing models of other parts of the AV.

A scenario extraction component A3 determines an encountered driving scenario for the ego vehicle using outputs of the data processing component A2. The determined driving scenario comprises driving scenario parameters which are extracted from the captured sensor data, and which provide a representation of a real-world scenario that has been encountered by the AV that is concise but sufficiently detailed to be used as a basis for realistic simulations.

The simulator A5 receives the parameters of the encountered driving scenario and can run simulations based on those parameters. These are simulations of what might happen in the encountered driving scenario under different assumptions. These simulations are used as a basis for AV planning, in which the AV planner A6 runs multiple simulations with the aim of determining a globally optimal sequence of manoeuvres to be taken in the encountered driving scenario to execute a defined goal (i.e. achieve a desired outcome, such as reaching a particular location on the map). In one example described in our Patent Application No. 1816853.4, the contents of which are incorporated by reference, the simulations are run as part of a Monte Carlo Tree Search (MTCS) executed by a manoeuvre selection component A7 of the AV planner A6.

When the ego vehicle is travelling, it must plan which manoeuvres to perform in order to execute a defined goal.

When the ego vehicle encounters an actual driving scenario it needs to navigate, the planning module A6 reasons systematically about the different possible outcomes of different ego manoeuvres (i.e. manoeuvres which the AV planner A6 of the ego vehicle might take) in the encountered driving scenario. For example a manoeuvre may determine that the AV needs to travel from its present location (starting point SP) to a certain endpoint EP. The determined manoeuvre is supplied to the simulator A5 which generates a number of candidate paths as will be described, each associated with a computed bound on collision risk. The candidate paths may be returned to the planner A6 to select a suitable path to execute.

For example, the paths can be synthesised for each goal using a Rapidly Exploring Random Tree (RRT) model. A space of predicted paths (search space) is defined based on the reference location for each goal and the current location $r_0$ of the external vehicle. The search space is then randomly sampled (based on randomized input parameters), in order to determine the set of n paths, and a likelihood of each of those paths. To simulate n paths for each goal, the relevant parameters of the RRT are randomised n times to perform n appropriately based random searches of the search space. In the present disclosure, the probabilistic risk of collision along a given trajectory may be calculated, and used to rank the candidate trajectories by safety. This in turn provides the likelihood of each sampled path on the assumption that the external vehicle is more likely to take safer paths to execute the goal in question.

The approach described herein is based on probabilistic robotics, wherein environmental uncertainty is posed probabilistically in the form of occupancy grids. However, the present disclosure seeks to relax several assumptions.

Firstly, the fact that collision probabilities are not independent from cell to cell in an occupancy grid representation is taken into account. Instead, the probability of collision at one cell is directly coupled to that at a nearby cell, via the latent variable of true object pose. Secondly, the grid representation is reconsidered and an alternative computational approach is adopted that allows paths and object shapes to be modelled in a continuous fashion, deferring approximations to a much later stage in the procedure.

A key contribution of the techniques described herein is a faster procedure for calculating integrals associated with the calculation of collision risk. This is achieved through the use of convolutions over boundary shapes. Given the shapes and uncertain location of obstacles in an environment, the problem is to estimate the risk of collision from taking a sequence of actions (i.e., traversing along a candidate path), given a description of the objects in the environment for a set of hypothetical paths. This risk can be posed in terms of the probability distribution for environment by the obstacles on the path swept by a moving robot during a specified time interval along that path.

Figure 27:
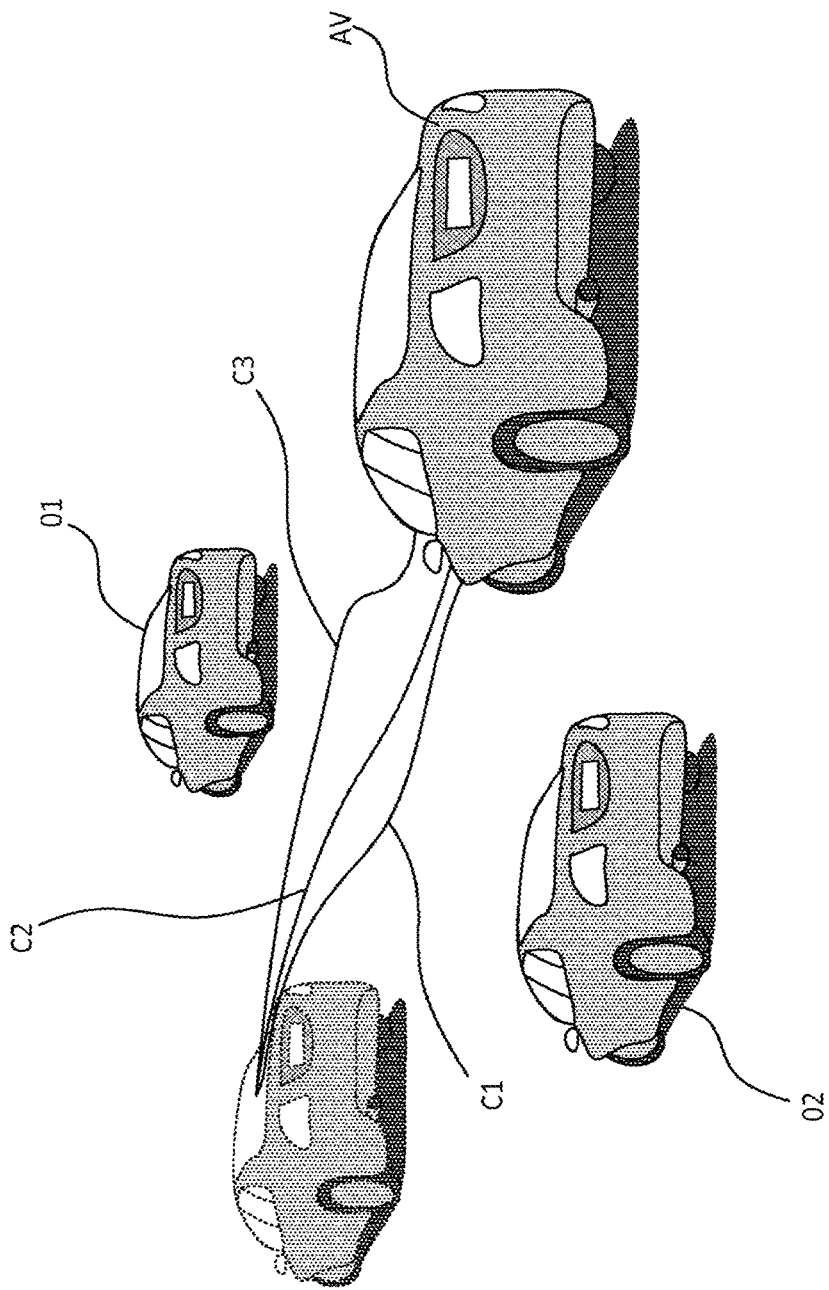
FIG. 27 is a visualisation of the motion planning problem for mobile robots.

FIG. 27 is a visualisation of the motion planning problem faced by a robot AV. The three curves represent possible paths C1, C2, C3 that the robot could traverse. The environment is represented by the two white cars $O_1$, $O_2$ whose position is known only up to probabilities, depicted by the distribution (over the centroids). The outcome of the computations is an assignment of risk of collision to each curve which defines a rank ordering (here C1 is most preferred and C3 is least preferred).

Both "tethered" and "dynamic" obstacle approaches are disclosed herein.

1. Tethered Obstacles

The details of the tethered obstacle method will now be described approach will now be described.

In the present context it is assumed that freespace in the plane is defined deterministically, and that a robot of known shape translates and rotates in freespace. In addition, discrete "tethered" obstacles $k=1 \ldots, K$ of known shape and uncertain location are introduced. The problem is then, over a (short) time-interval $t \in [0, \ldots, T]$ to:

Generate N hypothetical paths in configuration space for the robot.

Bound the probabilistic risk of collision, for each path: a bound Fr) is computed on the risk of collision for each path. The FPR algorithm introduced here computes a bound $F_T$ on risk of collision, which is then available for use in motion synthesis. Its computational complexity is O(N+K), compared with the O(NK) of earlier techniques.

The following inputs to the risk computation are assumed:

Freespace: it is assumed that freespace F is defined to be a subset of $\mathfrak{R}^2$. Then within F, obstacles are defined stochastically as below.

Robot: assumed to have a deterministic spatial extent and to be manoeuvrable in translation and rotation. Over the interval $t \in [0, \ldots, T]$, it sweeps out the set A in the plane of $r=(x, y)$.

Obstacle shape: the $k^{th}$ obstacle is assumed to have deterministic shape and mean orientation represented by the set $B_K$.

Tethered obstacle: tethering here means specifying a probability distribution $p_k(r)$ for the location of the $k^{th}$ obstacle, taking into account: i) variability arising from any possible motion over the time-interval $[0, \ldots, T]$; and ii) modelled uncertainty in object detector output. Obstacle locations are assumed to be mutually independent—arising from independent sensor observations.

Obstacle rotation: treated as part of its shape so, to the extent that an obstacle may rotate over the time interval $[0, \ldots, T]$, that rotation must be absorbed in a deterministic expansion of the set $B_K$.

This treatment of obstacle rotation is a limitation of the framework described herein which, however, is reasonable if the time interval $[0, \ldots, T]$ is short, so rotation is limited.

The Probabilistic Obstacle Framework: Laugier's Model

Consider an environment consisting of a set of K obstacles. These obstacles are typically detected by perceptual modules whose outputs are uncertain, hence we treat them as probabilistic. The position of each obstacle centre (or suitable canonical point, with respect to which all geometric computations can be reframed) is a random variable given by the density function $P_K(r)$, where $r=(x, y) \in \mathfrak{R}^2$ The probability of collision between the robot and the kth obstacle (which we will sometimes write as 'obstacle k'), if that obstacle were a point obstacle, could be written as $$P_D(k) = \int_A p_k(r) \qquad \text{(Equation 1)}$$

where A is the swept area of the robot, along a path $\pi$ and over time $t \in [0_1, T_2]$.

Now the total probability of collision is computed using the techniques of the Laugier et al paper reference earlier as $$P_D = 1 - \prod_{k=1}^{k} (1 - P_D(k)).$$

which must be recomputed for each swept path A of N hypothesised paths. However, when $P_D \ll 1$, as expected in practical, relatively safe situations, $P_D$ can be bounded by a close approximation, $P_D \leq F_D$ where $$F_D = \Sigma_{k=1}^{K} p_D(k) \qquad \text{(Equation 3)}$$

The inventors have perceived that the computation of $F_D$ in equation 3 can be made more efficient, i.e., of order O (1), by factoring it as:

$$F_D \leq \int I_A(r) G(r) \text{ where } G = \Sigma_{k=1}^{K} p_k(r) \qquad \text{(Equation 4)}$$

where $I_A$ denotes the indicator function for points belonging to the set A. The computation is O (N+K), not O (NK) since G can be precomputed and re-used for all hypothesised paths A. Most obstacles are not mere points. When an obstacle has a shape, $B_K \subset$, situated at the origin, then at position r' the displaced object would be described as $$B_k(r) = B_k + r = \{r+r', r'\} \qquad \text{(Equation 5)}.$$

Figure 2:
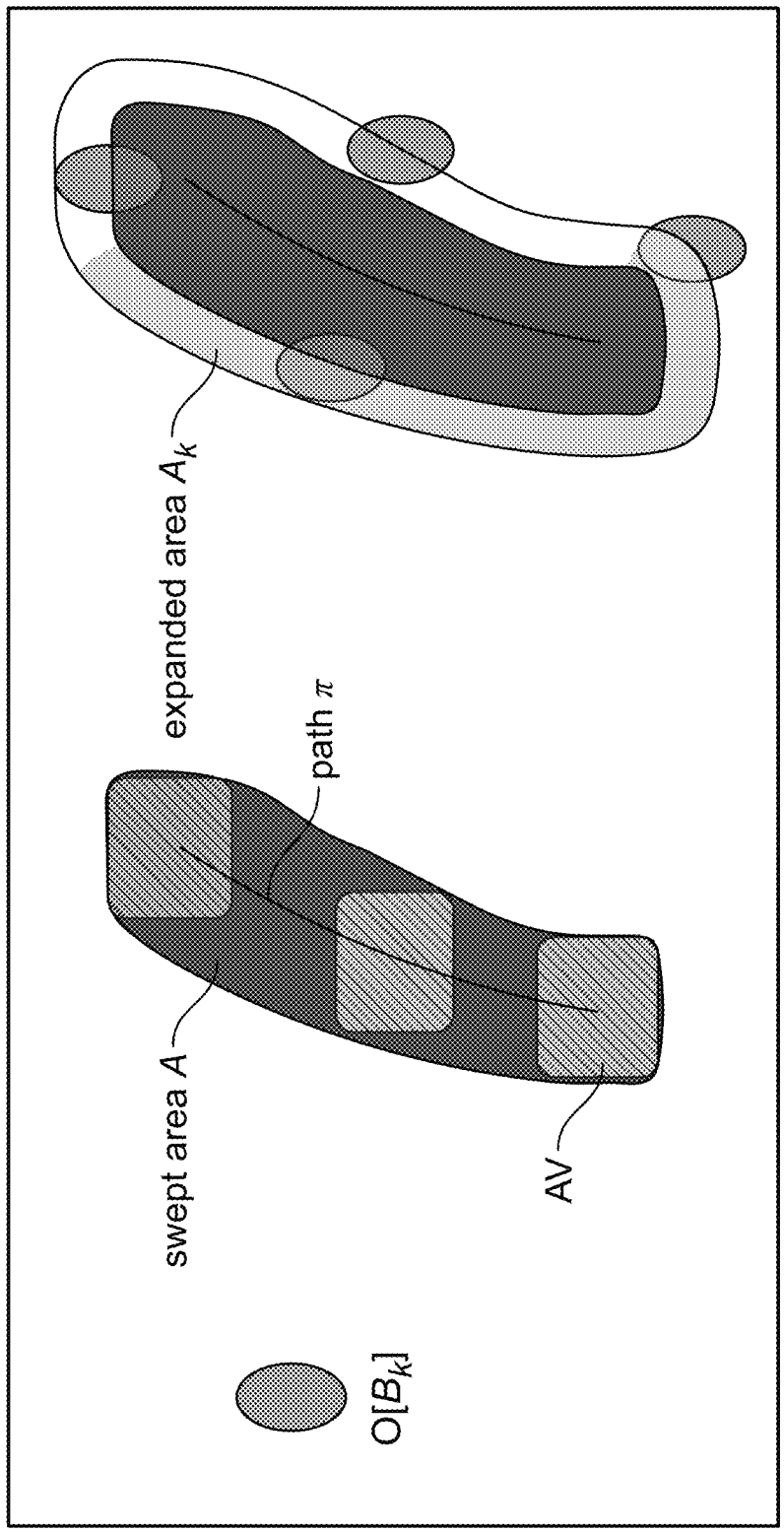
FIG. 2 is a diagram illustrating a Minkowski Sum showing a path π with swept area A, dilated by Minkowski sum with obstacle of shape $B_K$, to give the expanded swept area $A_K$.

So, the probability of collision with the obstacle may be rewritten as $$P_D(k) = \int_{A_k} p_k(r) \qquad \text{(Equation 6)}$$

where $A_k = A \oplus B_k$, the Minkowski sum of the robot shape and the obstacle shape, as in FIG. 2.

In prior search based planning algorithms, the Minkowski sums for $A_K$ must be recomputed for each new path A that is conjectured, and for every obstacle, $B_K$. This becomes inefficient when K, the number of obstacles, is large. In the present disclosure, there is presented a way to replace these repeated O (K) computations by an O (1) computation.

Minkowski Sum and the "Convolution Trick"

Note that the integral in Equation 6 can be rewritten as the convolution of two functions, evaluated at the origin, $$P_D(k)=[I_{A_k}*\tilde{p}_k(r)](0) \quad \text{(Equation 7)}$$

where $f^{\sim}$ denotes the reflection of a function, i.e., $f^{\sim}(r)=f(-r)$, and where the notation [ . . . ](r) means that the function defined in square brackets is evaluated at the location r. (So in this instance (7), the function in square brackets is a convolution of two functions, and is applied at the origin r=0.)

The inventors have noted that a connection between the Minkowski sum of two sets, and the convolution operator * applied to the indicator functions of the two sets may be used to advantage in this context. The connection is laid out in Equation 8.

$$Z=X\oplus Y \Rightarrow Z=\text{supp}(I_X*I_Y) \quad \text{(Equation 8)}$$

where supp(f) is the support of the function f. In particular, $$A_k=\text{supp}(I_A*I_{B_k}) \quad \text{(Equation 9)}$$

Figure 3:
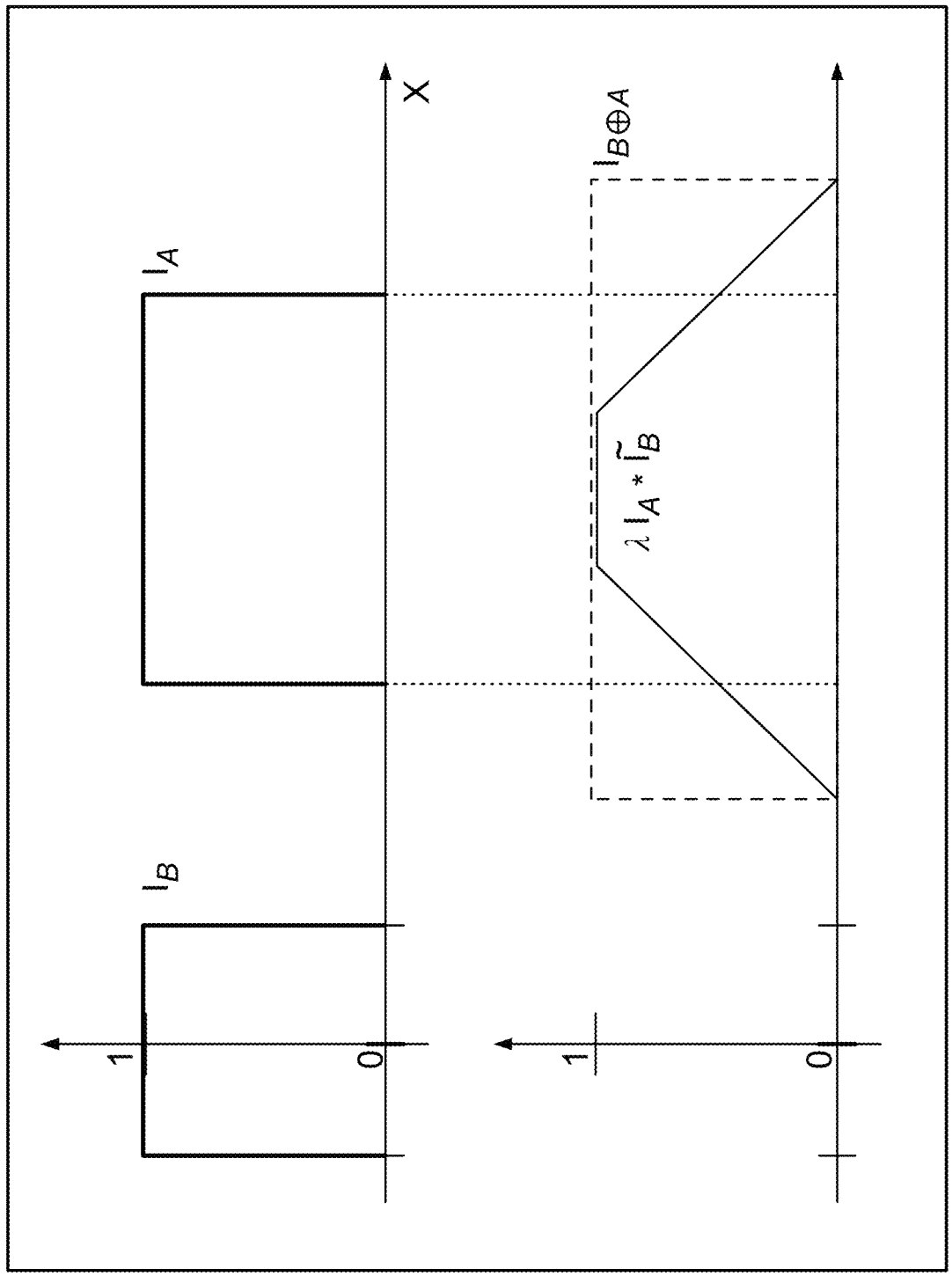
FIG. 3 are graphs illustrating convolution and the Minkowski sum.

In general, it need not be the case that the indicator of a Minkowski sum is simply (proportional to) the convolution of the two indicator functions (see FIG. 3), but over a restricted portion of the plane—corresponding to the case when the obstacle $B_K$ lies inside the robot path A, the following equality holds, $$I_{A_k}(r)=\lambda_k[I_A*\tilde{I}_{B_k}](r), \text{ when } B_k(r) \subset A \quad \text{(Equation 10)}$$

where $$\lambda = \frac{1}{\text{area}(B_k)}.$$

The expression on the right of this equation is everywhere positive as it is a convolution of indicator functions which are positive.

This provides a formula for calculating $I_{A_k}$ when $B_k(r) \subset A$. The following sets out a corresponding calculation for the case when $B_k(r) \subset A$.

Using Contours to Bound the Integral.

The complementary component of the Minkowski sum, $I_{A_k}$ can be bounded using a convolution of using the bounding contours of the obstacles, $\partial B_K$, and of the robot, $\partial A_K$, to obtain an upper bound on any integral of the form $\int_{A_k} f(r)$, and in particular on the collision probability in Equation 2.

Given the set A, the delta function ridge around its boundary $\partial A$ is calculated as, $$\partial A_\sigma(r)=|\nabla g_\sigma(r)*I_A(r)| \quad \text{(Equation 11)}$$

where $g_\sigma(r)$ is a normalised isotropic 2D Gaussian function with a (small) diameter $\sigma$. Similarly, $\partial B_{(k,\sigma)}(r)$ is defined as the delta function ridge around $\partial B_K$. Now, the indicator function for the Minkowski sum is bounded in the complementary condition, and in the limit that $\sigma \to 0$, by the convolution of the two delta function ridge functions as follows, $$I_{A_k}(r) \leq \tfrac{1}{2}[\partial A_\sigma * \widetilde{\partial B_{k,\sigma}}](r), \text{ when } B_k(r) \subset A \quad \text{(Equation 12)}$$

Figure 4:
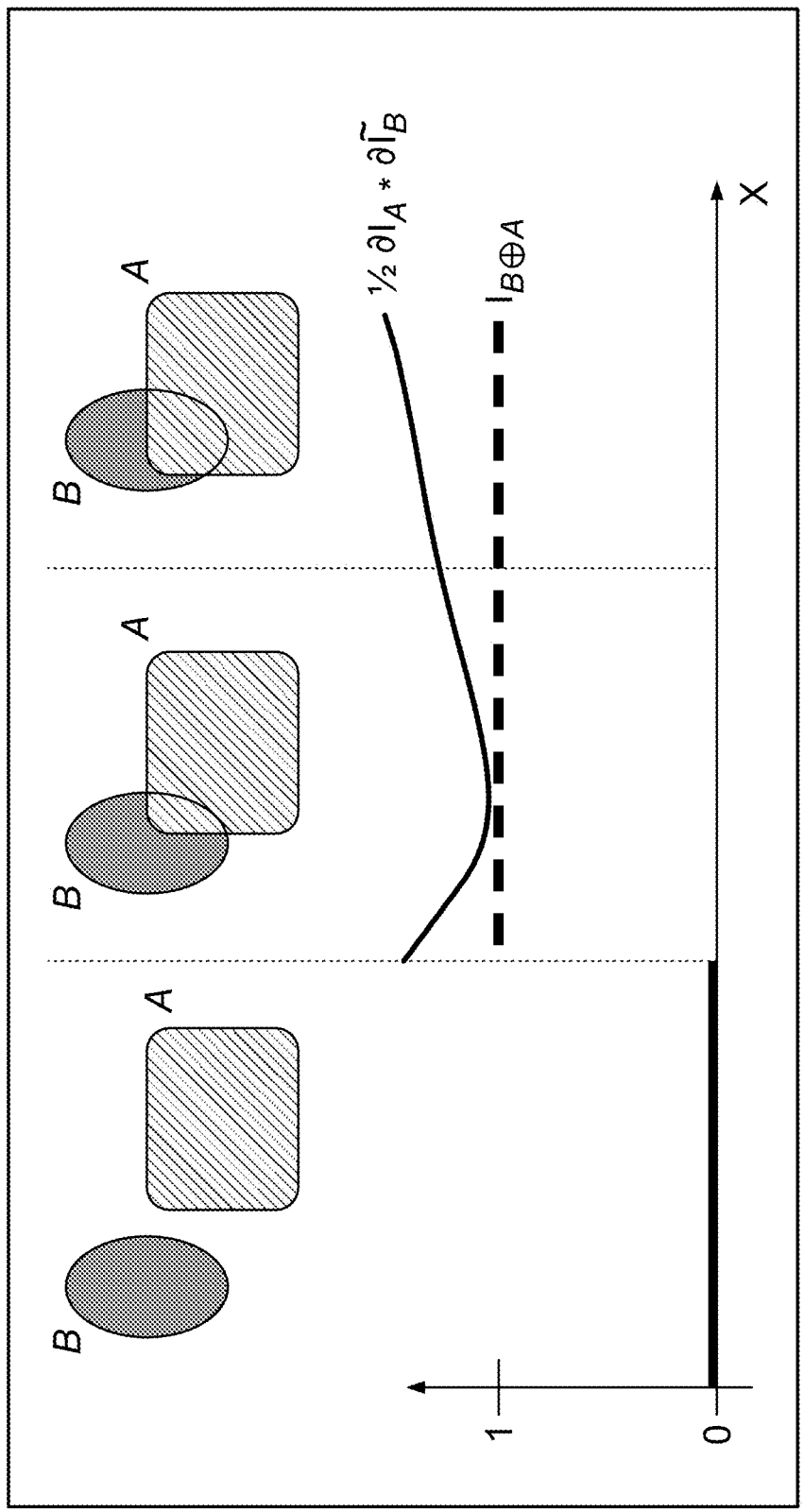
FIG. 4 is a graphical representation of a contour convolution in which the indicator function of the Minkowski sum of sets A and B is approximated via contour convolution.

This is illustrated in FIG. 4 which is an illustration in 1D of the fact that the indicator of a Minkowski sum is not generally equal to the convolution of the two indicators, but they do share the same support.

As with equation 10, the right hand side of the inequalities in 12 is everywhere positive. So, now the complementary expressions in Equations 10 and 12 can be combined into a single bound on the indicator function of the Minkowski sum, $$I_{A_k}(r) \leq \tfrac{1}{2}[\partial A_\sigma * \widetilde{\partial B_{k,\sigma}}](r) + \lambda_k[I_A*\tilde{I}_{B_k}](r) \quad \text{(Equation 13)}$$

As this bounds holds everywhere, we may write, $$I_{A_k} \leq \tfrac{1}{2}[\partial A_\sigma * \widetilde{\partial B_{k,\sigma}}] + \lambda_k[I_A*\tilde{I}_{B_k}] \quad \text{(Equation 14)}$$

Returning to the earlier expression for the collision probability, in equation 2, $$P_D(k) \leq [[\tfrac{1}{2}[\partial A_\sigma * \widetilde{\partial B_{k,\sigma}}] + \lambda_k[I_A*\tilde{I}_{B_k}]]*\tilde{p}_k](0) \quad \text{(Equation 15)}$$

Using the associativity of the convolution operator, this may be rewritten as, $$P_D(k) \leq [\tfrac{1}{2}[\partial A_\sigma * \widetilde{\partial B_{k,\sigma}} * \tilde{p}_k](0) + \lambda_k[I_A*\tilde{I}_{B_k}*\tilde{p}_k](0)] \quad \text{(Equation 16)}$$

Finally, $$P_D(k) \leq \int \partial A_\sigma \tfrac{1}{2}[\partial B_{k,\sigma}*p_k] + \int I_A[\lambda_k I_{B_k}*p_k] \quad \text{(Equation 17)}$$

Summing up over obstacles, the bound on number of collisions is, $$F_D \leq \int \partial A_\sigma(r) G_\sigma(r) + \int I_A(r) G(r) \quad \text{(Equation 18)}$$

where $G_\sigma = \tfrac{1}{2}\Sigma_k \partial B_{k,\sigma}*p_k$ and $G = \Sigma_k \lambda_k I_{B_k}*p_k$.

Note that G and $G_\sigma$ are independent of A and do not need to be recomputed every time A changes. So, the repeated computation of the bound (Equation 18) for N different swept paths A would indeed have complexity be O(N+K). That is, the path computations are independent of the number of obstacles—once the initial calculations of G and G_$\sigma$ have been carried out. The above "convolution test" gives a Fast Path Risk (FPR) method to calculate the bound on the number of collisions, summarised in Algorithm 1. (Shown in Annexe A).

Proof of the "Contour Convolution Trick":

That the indicator function for the Minkowski sum (in the limit that $\sigma \to 0$), in the inequality of Equation 10, is indeed bounded can be shown as follows $$I_{A_k}(x) \leq \tfrac{1}{2}[\partial A_\sigma * \widetilde{\partial B_{k,\sigma}}](x) \quad \text{(Equation 19)}$$

In the case that $B_K(x) \cap A = \phi$, both sides of equation 17 are 0. Elsewhere, and given that $B_K(x) \subset A$, the contours of A and $B_K$ must intersect at least twice. In that case, $$[\partial A_\sigma * \widetilde{\partial B_{k,\sigma}}](x) = \int_x \partial A_\sigma(x') \partial B_{k,\sigma}(x-x') \quad \text{(Equation 20)}$$

integrates across two or more contour intersections, and the integral at each intersection (contours crossing at an angle $\theta$) has the form, $$\int\int g_\sigma(x) g_\sigma(x\cos\theta + y\sin\theta) dx dy = \frac{1}{\sin\theta} \geq 1 \quad \text{(Equation 21)}$$

In the limit when $\sigma \to 0$, since the indicator function $I_{AK}(x)$ has value 1 whenever the contours intersect, the formula 17 does indeed hold.

Figure 26:
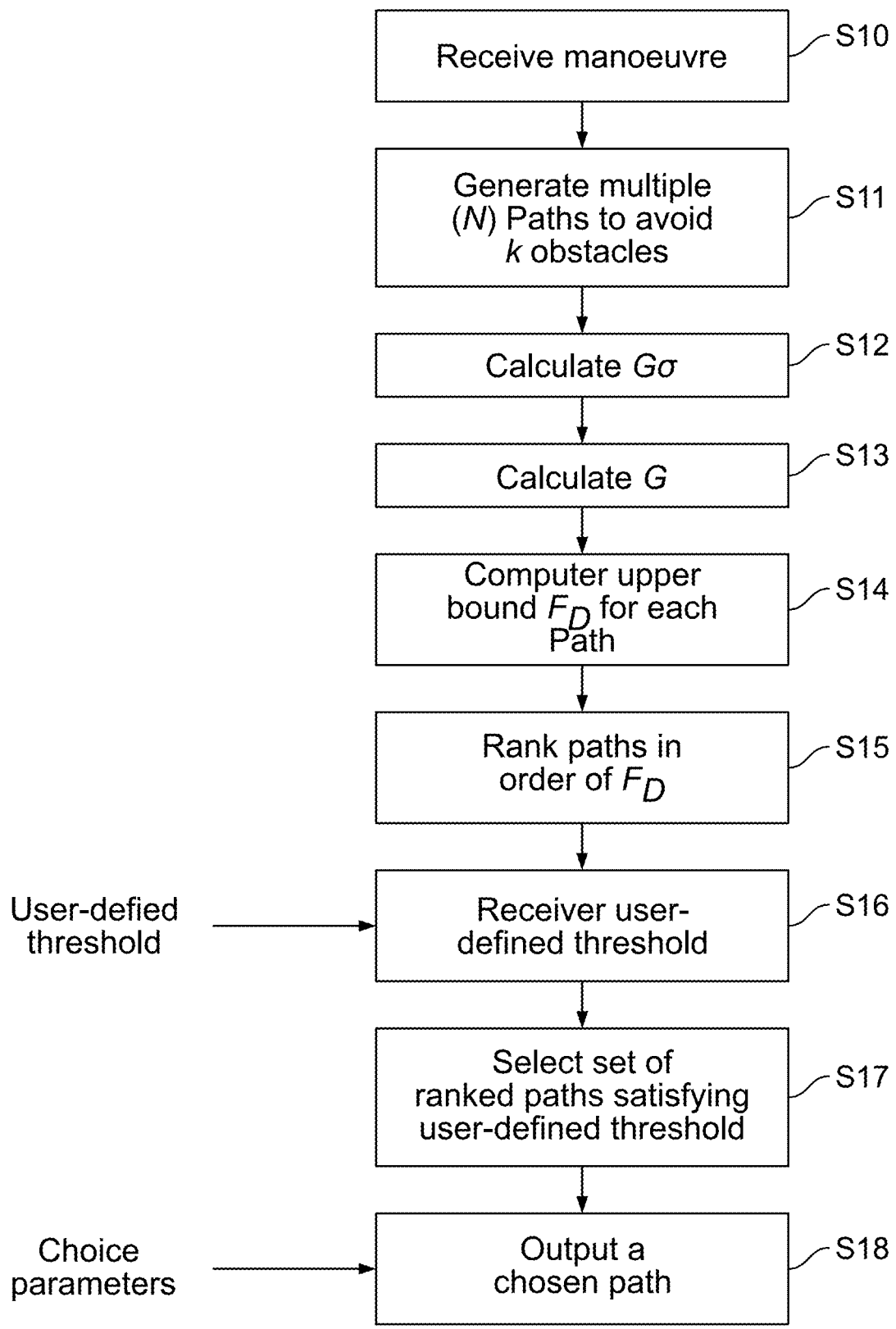
FIG. 26 is a flow chart of a path planning method.

FIG. 26 is a flow chart illustrating a planning method comprising various aspects described herein. At step S10 a manoeuvre is received from the planner A6. Multiple paths are generated to avoid K obstacles at step S11 eg. by an RRT algorithm. Factors GG and G are calculated across all obstacles. Although these are shown in order S12, S13, it will readily be appreciated that they could be calculated in a different order, or indeed simultaneously (as they are not interdependent). At step S14 the upper bound $F_D$ is computed for each path using equation 18. In each computation for each path, the same value of $G_o$ or G is utilised for the obstacles which have been detected for this set of candidate paths. At step S15 the paths are ranked in order of the computed upper bound. The ranked paths may be returned from the simulator to the planner. A user-defined threshold is received at step S16. This user-defined threshold may be a threshold on an acceptable level of primary risk, and may therefore set a certain value of $F_D$ below which paths are considered not safe enough. At step S17 a set of ranked paths is selected which satisfy the user-defined threshold. At step S18 on operating path is chosen from the selected set of ranked paths, using a path selection parameter, for example comfort or efficiency.

The ability to receive a user-defined threshold on primary risk opens up many useful possibilities. An externally defined threshold of risk may be applied and candidate paths (across all obstacles) which do not satisfy that level of risk may be deselected. This enables for example a regulatory or insurance body to apply a threshold of safety, and the techniques described herein ensure that that can be met in the path planning. It further enables candidate paths which have not been deselected to remain available such that other path selection parameters can be utilised, for example comfort or efficiency as mentioned. This provides a convenient way of handling the potential difficulty of optimising both for a primary risk (collisions) and other nevertheless important factors. This has a number of possible applications.

For example, on-board sensors are responsible for detecting the environment and providing sensor data which is supplied to object detection algorithms. Object detection or recognition may be hampered by a number of aspects for example, it is possible that accuracy of recognition may differ between different object classes. Put simply, some objects may be more reliably detected than others. The present approach enables an operating path to be selected from candidate paths which achieves a minimum level of safety for all object recognition classes regardless of their accuracy. It may be that in path planning the robot can avoid collisions with obstacles in certain object classes at a higher level of safety (due to increased accuracy of detection for example), but at least a minimum level of safety is guaranteed across all object classes.

Shape models for obstacles have been mentioned earlier. One way of determining the shape of an obstacle is to access a shape model for that kind of obstacle. For example, if the obstacle has been identified as a vehicle, a shape model may be a rectangle or ellipse of certain dimensions. According to another example, pedestrians (and other small moving objects) may be modelled as zero dimensional shapes. Note that this does not mean they become invisible with respect to the planning, but are mathematically treated as a zero dimensional shape. In effect, they have been reduced to point obstacles.

Another way of determining the shape would be to use the object recognition algorithms to actually determine a particular shape for each obstacle. This is likely to be more complex but the techniques described herein could also be used in such a circumstance.

Experiments have been carried out to demonstrate that sets of randomly generated trajectories, for a particular environment configuration, can be efficiently labelled by the FPR algorithm, according to the bound $F_D$ on the risk of collision for each path. The FPR algorithm is agnostic as to the motion planner used to synthesise the candidate trajectories and is generally compatible with state of the art methods for motion planning (as outlined for example in C. Katrakazas, M. Quddus, W.-H. Chen, and L. Deka, Real-time motion planning methods for autonomous on-road driving, Transportation Rsch Part C: Emerging Technologies, 60, 416-442, 2015. A Closed Loop variant CL-RRT of the RRT algorithm is used to generate hypothetical paths in the environment, draw from the kinodynamicmodel for a particular robot. See for example Y. Kuwata, J. Teo, G. Fiore, S. Karaman, E. Frazzoli, and J. P. How, Real-time motion planning with applications to autonomous urban driving, IEEE Trans. Control Systems Tech., 17, 5, 1105-1118, 2009 and S. M. LaValle, Rapidly-exploring random trees: A new tool for path planning, Tech Rep., 1998. This has the advantage of generating typically smooth paths, that are plausible paths for that robot. Then the risk bound is calculated for each generated path.

First the results demonstrate the FPR algorithm for three simulated environments, then for a real environment taken from an aerial view. In each case, higher risk paths take tighter lines around obstacles, as would be expected. The experiments show: i) how close the bound on risk is to the true risk; and ii) that the use in FPR of the "convolution trick", which improves computational complexity from O(NK) to O(N+K) as explained earlier, leads to substantial reductions in practical computation times.

Simulated Environments

In the experiments, a 2D simulation is used in which a rectangular robot of size 2 m×4 m navigates along continuous paths, defined as the progression of full pose over time (though visualisations only depict the centroid). A simulation scenario is defined as a collection of obstacles within the environment, each specified as a shape (a subset of 2), and pose, together with positional uncertainty, as well as start and target poses for the ego vehicle.

Figure 5A:
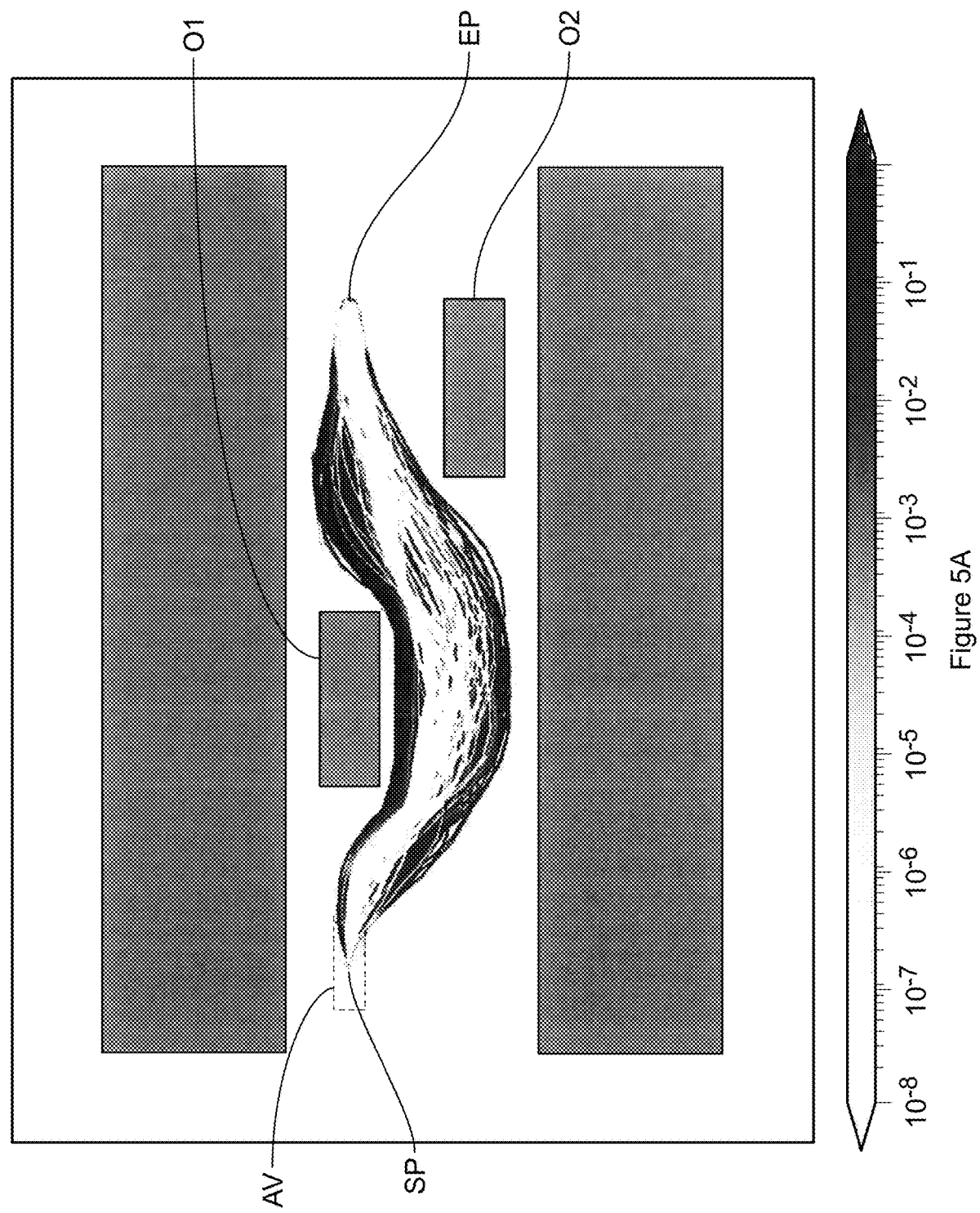
FIGS. 5A and 5B illustrates visualisation of paths for two different simulated.
Figure 5B:
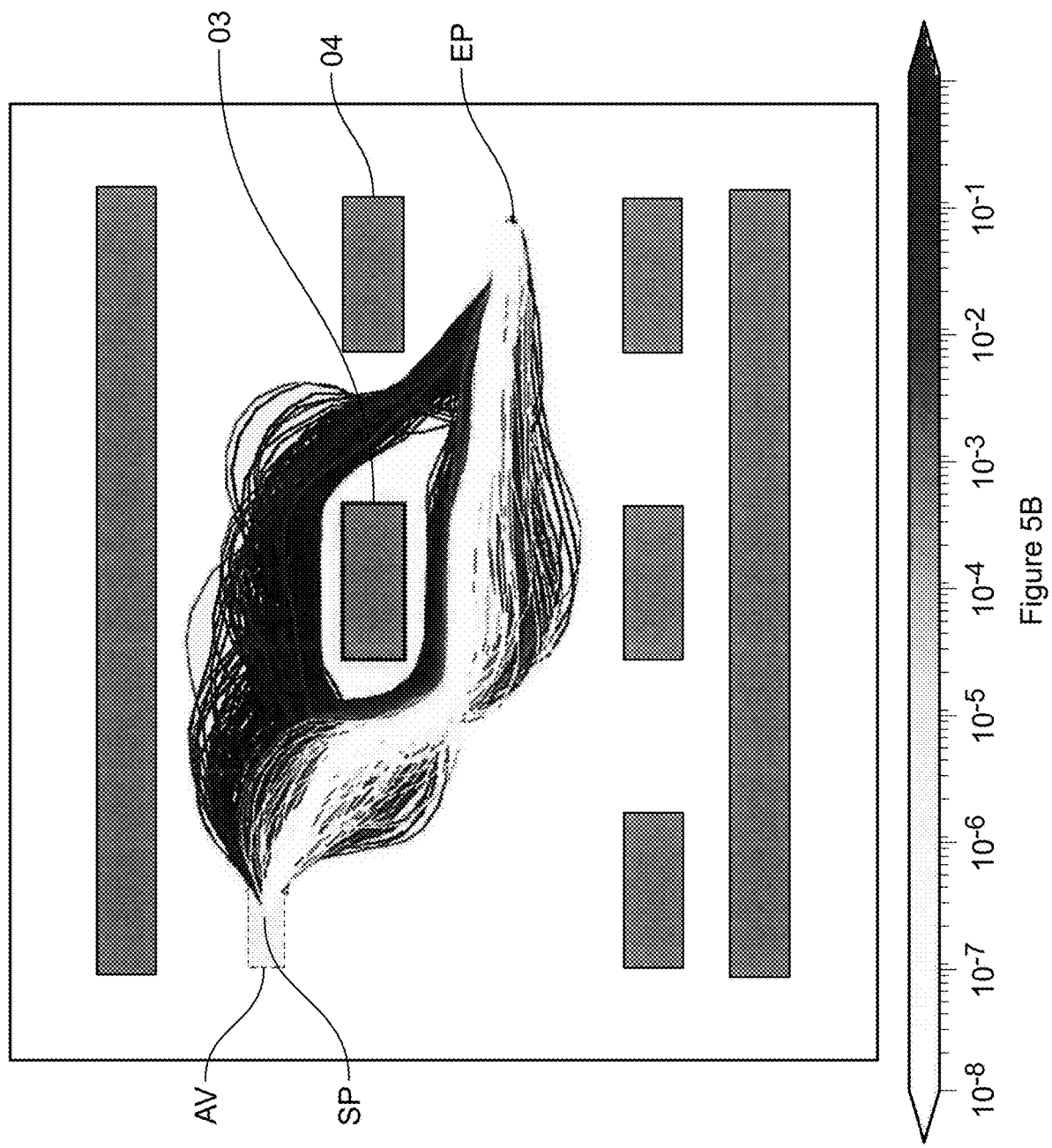
Figure 6:
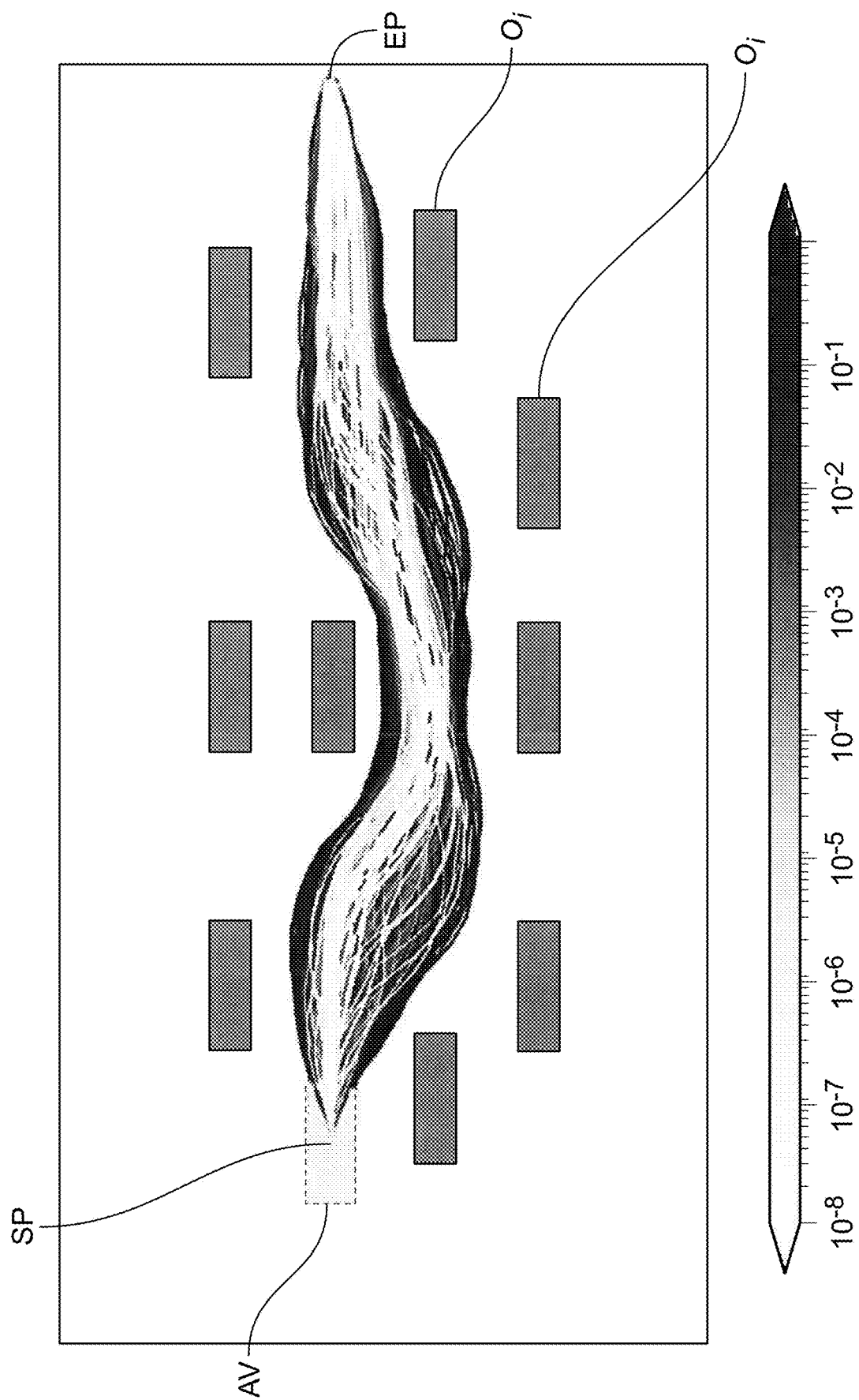
FIG. 6 illustrates visualisation of paths in an environment with more obstacles.

The three simulated scenarios used here resemble sections of a car park: two each with just two car as obstacles (FIGS. 5A and 5B), and a third with a more complex arrangement (FIG. 6). In each case, 400 paths are generated at random by CL-RRT. The uncertainty over each obstacle's position is modelled as a two-dimensional Gaussian distribution with standard deviation 30 cm, which is 15% of each obstacle's width. FIGS. 5A and 5B show paths for two different simulated environments. A set of candidate paths are generated with fixed start SP and end poses EP. The dark objects are obstacles, O1. O2 etc. whose position is known with an uncertainty visualised here as a shaded halo. Risk bounds $F_D$ on each path are represented by different shades of grey, on the logarithmic scale S2 shown. Safer paths maintain greater clearance around obstacles as expected. Some risky paths involve squeezing through a narrow gap. In the second scenario (FIG. 5B), the robot AV is able to squeeze through a narrow gap, but at some considerable risk of collision. In FIG. 6, a more complex environment is shown with more obstacles $O_j$, and again higher values of the bound $F_D$ on the risk of collision correspond to tighter clearances.

FIG. 6 shows paths with varying values of $F_D$, with tighter clearances when the bound $F_D$ on collision risk is high. Risk bounds are shown on same scale as FIG. 5.

Real Aerial Data

Figure 1:
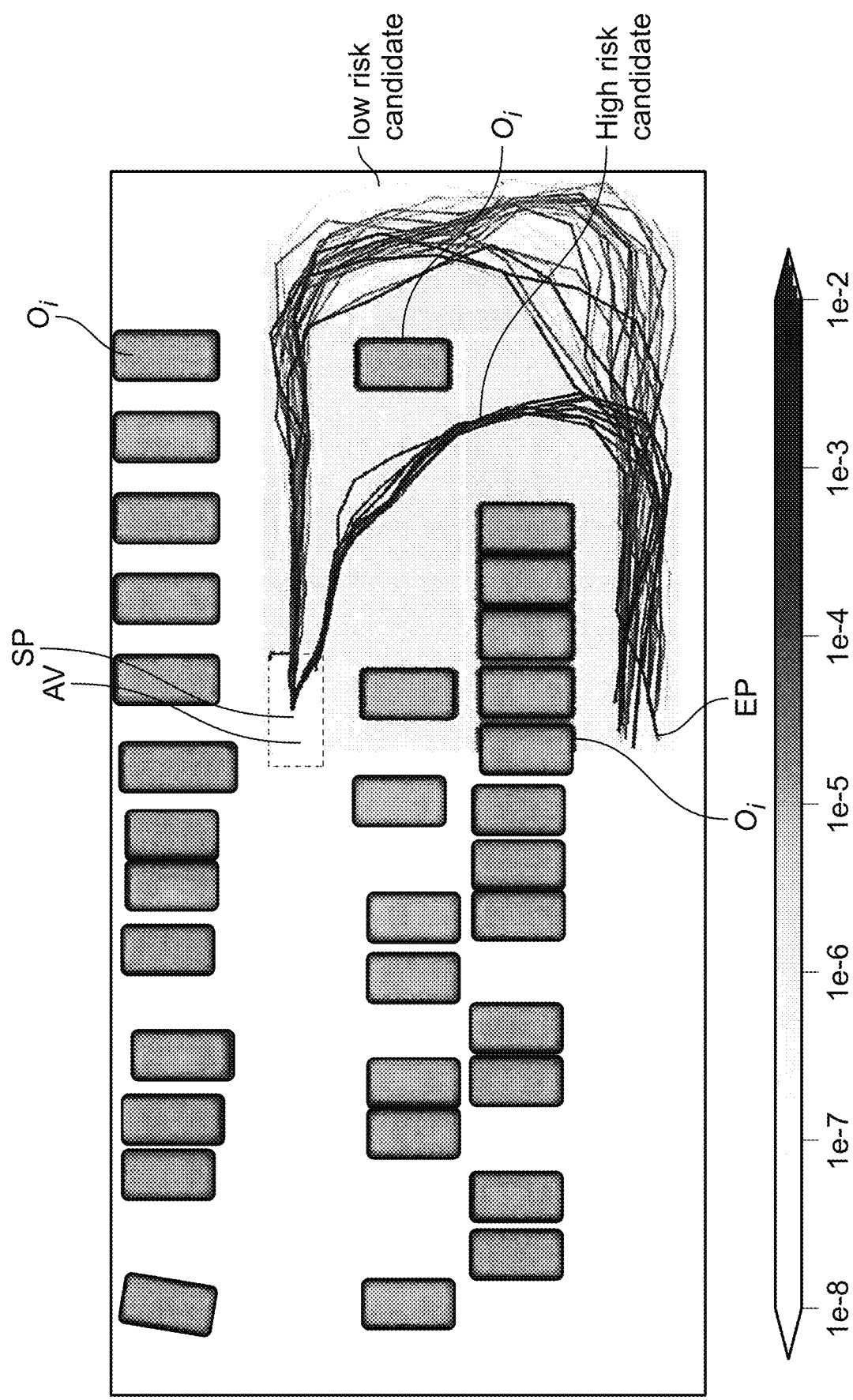
FIG. 1 is a representation based on data taken from an aerial view of a car-park illustrating the robot planning problem, with trajectories shown in shades of grey according to risk of collision.

In FIG. 1 an aerial view of a car park is shown, with a set of candidate paths for the robot AV generated by CL-RRT, between fixed start and end points. Obstacle vehicle shapes $O_i$ are represented as bounding rectangles. The obstacles here are 35 cars with shapes given by the bounding boxes shown in a fixed line, and uncertainties in location visualised as a slightly darker "fuzzy" halo around each bounding box. The robot vehicle AV has a set of candidate paths, evaluated here as high risk (dark grey) to low risk (white) according to the scale shown. Bounds on collision risk are represented by different shades of grey as on the logarithmic scale S1 shown. Some higher risk paths involve squeezing through a narrow gap. Error in estimated position of the obstacle-cars is Gaussian with standard deviation of 0.3 m. The candidate paths are shown in different shades of grey according to the computed value of the bound on collision risk. This turns out to include safer paths with collision risk down to $10^{-5}$ and below, and riskier paths, above $10^{-2}$ risk of collision, that involve squeezing through a narrow gap.

Performance Evaluation

Figure 7:
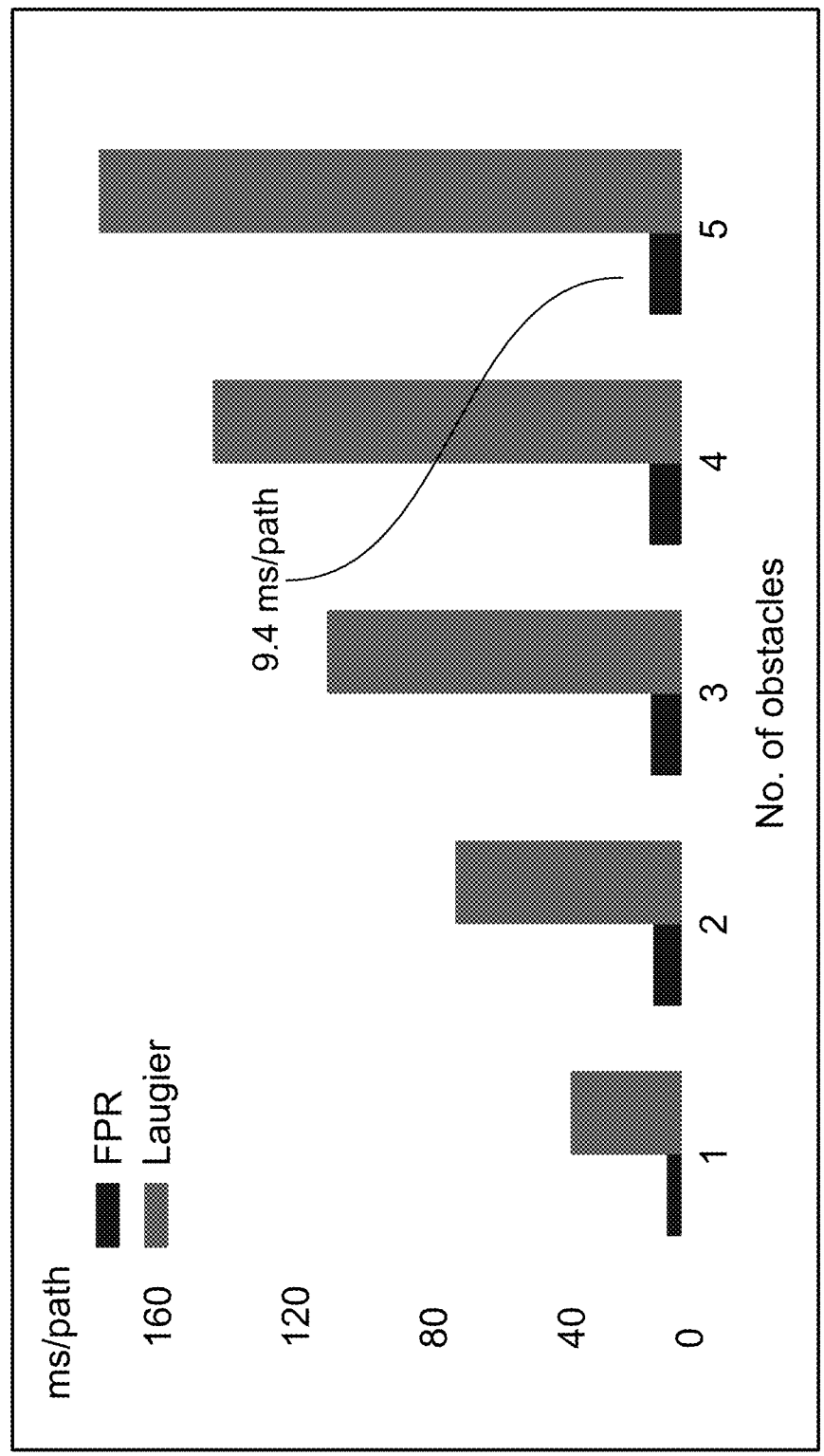
FIG. 7 is a graph comparing the complexity and performance of the FPR (Fast Path Risk) computation described herein of the bound $F_D$ on collision risk, using the car park data from FIG. 1, with a Laugier computation.

Experimental results given here illustrate the computational benefits of the FPR approach for evaluating bounds on risk. In FIG. 7, empirical data is presented regarding the computational complexity of the present method compared to the baseline of computing the integral in Equation 6) directly. FIG. 7 shows that computing the FPR bound on risk is significantly faster than exact computation via Laugier integrals. This is true in absolute terms, thanks to the use of efficiently implemented convolution, in place of Minkowski sum. It is also true in complexity, giving almost constant computation time with respect to the number K of obstacles, cf. linear growth. In absolute terms, even for one obstacle, average runtime is 9 times faster for FPR, owing to the use of efficiently implemented convolution in place of Minkowski sum. Then for increasing numbers of obstacles, runtime becomes almost constant with the number of obstacles at 9.4 mc/path, cf. linear growth for direct computation of the Laugier integrals (6) for each obstacle. This is consistent with O(N+K) complexity c.f O(NK) complexity (for N evaluated paths), as expected from the theory outlined above.

A consideration of how tight is the bound on collision risk.

The FPR algorithm computes the bound $F_D$ on the exact risk $P_D$ computed as in (Equation 2) and (6). The slack in the bound is evaluated in several situations to see how close the bound is in practice.

Consider the simplest interesting situation with one square robot and an identical square obstacle, at various relative orientations and distances (from 0.75 of a square diameter up to 1.75 diameters), and where p1(r) is Gaussian with s.d. of 0.25 of a square diameter.

Statistics are averaged over all the paths in the car-park data, representing the car-obstacle shapes $B_k$ as rectangles.

Figure 8:
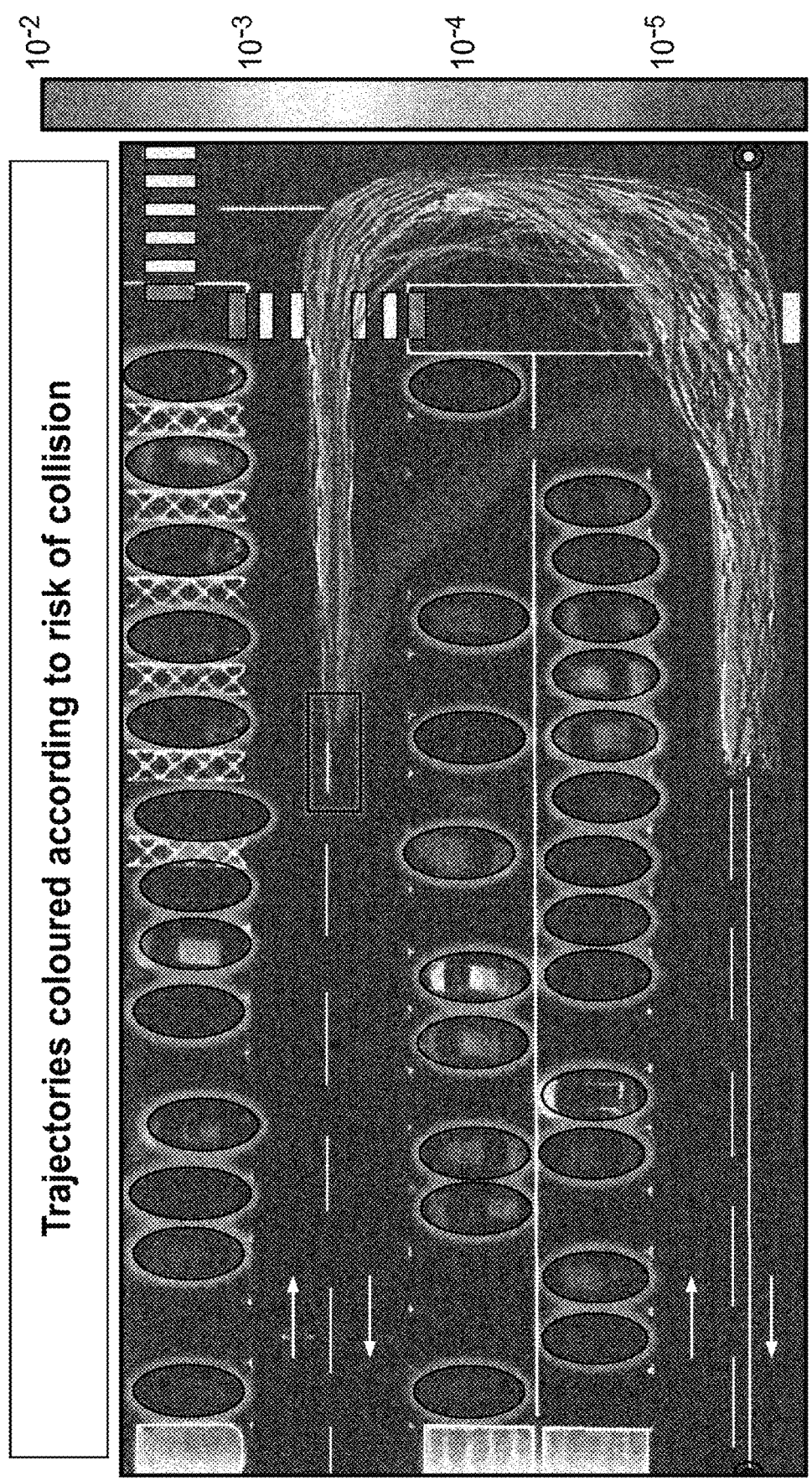
FIG. 8 is a representation of data from an aerial view of the car-park with the vehicles represented as elliptical shapes.

The rectangle shapes above are replaced with bounding ellipses, as in FIG. 8. Bounds $F_D$ on collision risk are calculated here using elliptical rather than rectangular bounding shapes for the obstacles. This produces tighter bounds, so risk values $F_D$ are generally lower than for FIG. 1.

Figure 9:
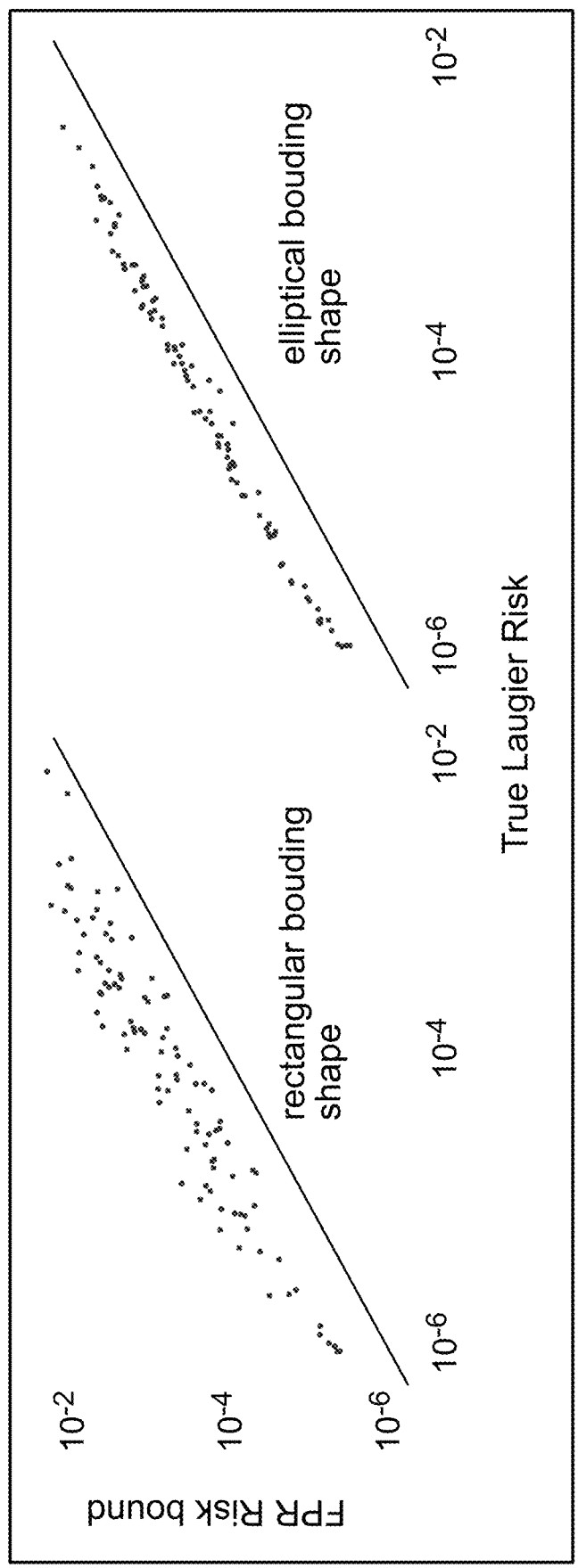
FIG. 9 is a plot of bounds on collision risk plotted for elliptical and rectangular bounding obstacle shapes in the car-park data of FIGS. 1 and 8.

For the two squares, the bound is quite tight, ceding a factor of just 1.9 in risk on average. For the car park, the bounds are rather loose, with a factor of 8.9 of slack on average. When ellipses are used in place of rectangles, the slack is tightened to a factor of 4.7 on average. These slack factors occur more or less uniformly at high and low risk, as FIG. 9 shows. In FIG. 9, bounds $F_D$ on collision risk are plotted for elliptical and rectangular bounding obstacle shapes. Risk bounds have, on average, a factor of up to an order of magnitude slack for rectangular shapes, and that is true both at low and high risk. Bounds are tighter for elliptical obstacle shapes. One reason on why the the bound is slacker for rectangles than ellipses is because configurations in which the robot rectangle is almost tangential to an obstacle rectangle occur frequently, causing a spike in the contour-convolution (see FIG. 4). This effect is abated when the bounding obstacle shapes are ellipses, since extended tangency is avoided.

Implementation Details

As described above, an augmented version of the CL-RRT planner, with probabilistic sampling is used in the above examples, similar to other approaches for heuristically biasing RRT growth as described for example in C. Urmson and R. Simmons, "*Approaches for heuristically biasing rrt growth*", in IEEE Int. Conf. IROS, 2, 1178-1183, 2003. Tree nodes are chosen for expansion according to their scores. It discretises steering and accelerator input ranges when expanding the random tree, to generate realisable trajectories, and in order to restrict abrupt steering or velocity changes. Nodes in the RRT are scored based on their proximity to the goal, and similarity to its orientation and velocity. The $k^{th}$ tethered obstacle is made deterministic, for the purposes of CL-RRT, taking the shape Bk at the mean location over pk. Throughout the experiments freespace is discretized on a grid with a resolution of 5 cm/px. The constant for Gaussian convolution, σ=1 grid square, is just big enough for good numerical behaviour. All of the numerical computations are implemented using the GPU-enabled Python module for linear algebra CuPy.

The approach described herein to safe motion planning bounds the risk of collision for candidate paths in configuration space. An acceptably safe path is then taken to be one that satisfies $F_D \leq 0$, for some user-supplied threshold θ on risk. The FPR algorithm builds on a probabilistic framework for calculating collision risk, and uses the convolution trick to render these computations in linear time in N and K. Amongst trajectories deemed safe enough, there is then freedom to optimise for other criteria such as rider comfort and travel time.

Returning to FIG. 23, there is additionally shown an object tracking block A14 within the data processing system A2. Object tracking is used to track any movement of detected objects within the environment. The result is an observed trace (τ) of each object that is determined over time by way of the object tracking. The observed trace τ is a history of the moving object, which captures the path of the moving object over time, and may also capture other information such as the object's historic speed, acceleration etc. at different points in time.

2. Dynamic Obstacles

The tethered obstacle method described above is applicable to stationary obstacles but also moving obstacles in certain contexts. As noted, in the tethered obstacle method, any obstacle motion is accounted for in the level of uncertainty ascribed to each obstacle's location within the xy-plane, and the area of the xy-plane over which the motion planning is performed constitutes a "collision space" for that method.

However, the probability density function $p_k(r)$ is not time-variable: the fact that the probability of a moving obstacle being at a given location may be different at different times is not explicitly accounted for. This is a reasonable framework in certain practice contexts, particularly where the time interval [0, . . . , T] over which the analysis is performed is relatively short, such that each obstacle exhibits at most limited motion over that time period.

However, for longer time periods, a spacetime motion planning approach may be preferable, in which motion planning is performed in three-dimensional (3D) spacetime (xyt-space). That is, 3D space having two spatial dimensions (x, y) and one dimension of time t. This may be referred to herein as a dynamic obstacle method as it can account for a greater range of obstacle motion though explicit time-dependency. In this context, the collision space is a volume in 3D spacetime.

Figure 10:
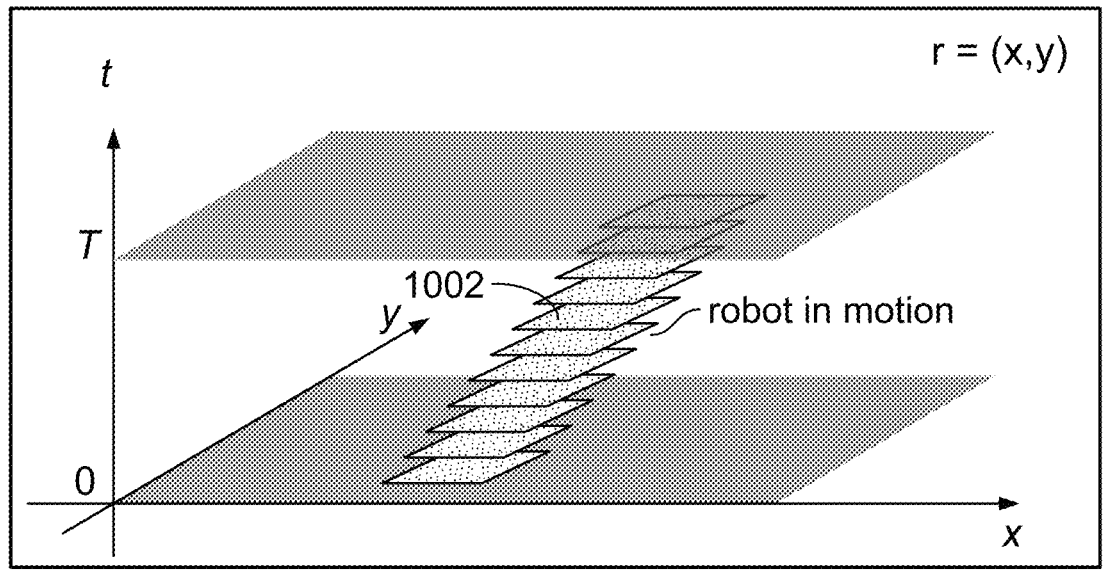
FIG. 10 shows a spacetime representation of a robot path.

FIG. 10 shows a schematic illustration of a spacetime coordinate system, in which motion of a mobile robot in the xy-plane over a time interval [0, T] is represented. The robot is is in the form of an autonomous vehicle (AV) in the present example, but as noted above can take other forms.

The time interval [0, T] is the time interval over which collision risk is evaluated for multiple candidate paths and potentially multiple obstacles. The AV is assumed to have a known shape denoted by reference numeral 1002. At any given time t∈[0, T], the AV is represented by the area of the AV shape 1002 in the spacetime plane defined by t (lying parallel to the xy-plane), at a location in that plane which depends on the AV's speed and direction of motion.

A spacetime plane can, in general, have any orientation within spacetime. However, hereinbelow, the term spacetime plane (or simply plane) is used to refer to a spacetime plane of constant time i.e. lying parallel to the xy-plane and defined by a given point in time (unless otherwise indicated). Physically, this corresponds to a "snapshot" of the spatial area over which the motion planning analysis is performed at that time. The planes t=0 and t=T may be referred to as the starting and destination planes respectively.

Figure 11:
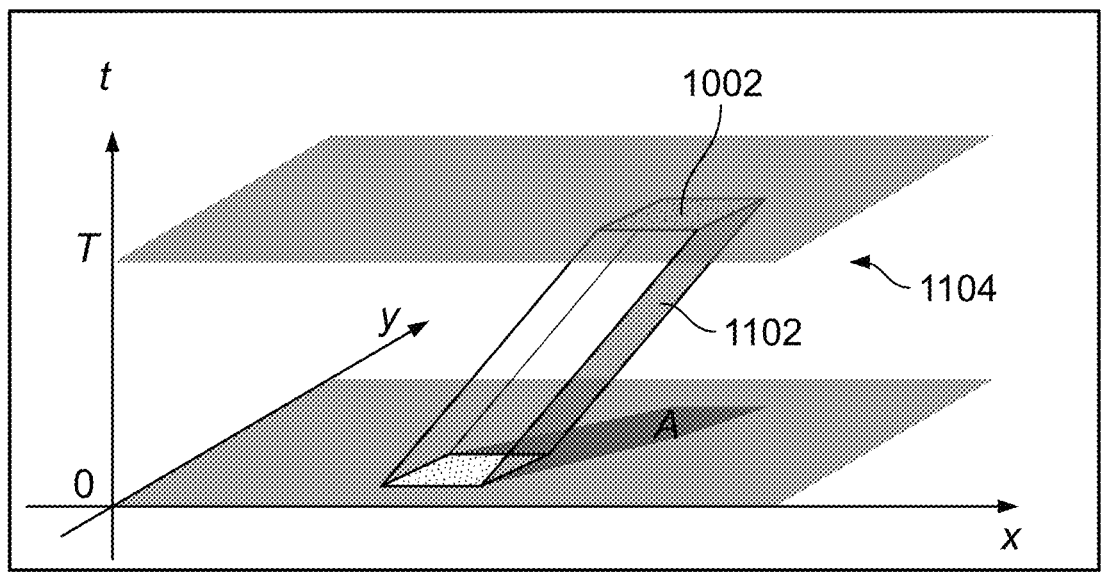
FIG. 11 shows a robot path determined as a spacetime tube within a spacetime volume.

FIG. 11 shows a spacetime volume 1102 which represents a path travelled by the AV as a "spacetime tube" 1102. The spacetime tube 1102 is analogous to the swept area A of the tethered obstacle method above and is a volume of spacetime traversed by the robot in moving along the path in the time interval [0, T].

The geometric projection of the spacetime tube 1102 onto the spacetime plane t=0 is the swept area A on which the tethered obstacle method is based. Note this is only shown for the sake of comparison with the above tethered obstacle method—the geometric projection of the spacetime volume 1102 (i.e. the projecting along rays extending parallel to t=0) is not used or computed in the dynamic method described herein.

The cross-sectional area of the spacetime volume 1102 within any given spacetime plane (i.e. the intersection of the spacetime volume 1102 with that spacetime plane) is the area defined by the shape of the AV 1002 in the xy-plane.

The spacetime tube 1102 representing the AV's path in spacetime is contained within a spacetime volume 1104 which separates the spacetime plane t=0 from the spacetime plane t=T. The spacetime volume 1104 is the collision space in which motion planning is performed for the dynamic method.

Note that, whilst, in a strict mathematical sense, a spacetime plane extends to infinity, in the present context the term plane may be used to refer to a finite area within spacetime, corresponding to the spatial area over which the analysis is performed. That is, the term "plane" may be used as shorthand to refer to a finite portion of a plane in the strict mathematical sense. Hence, the collision space 1104 over which motion planning is performed is also a finite volume.

Figure 12:
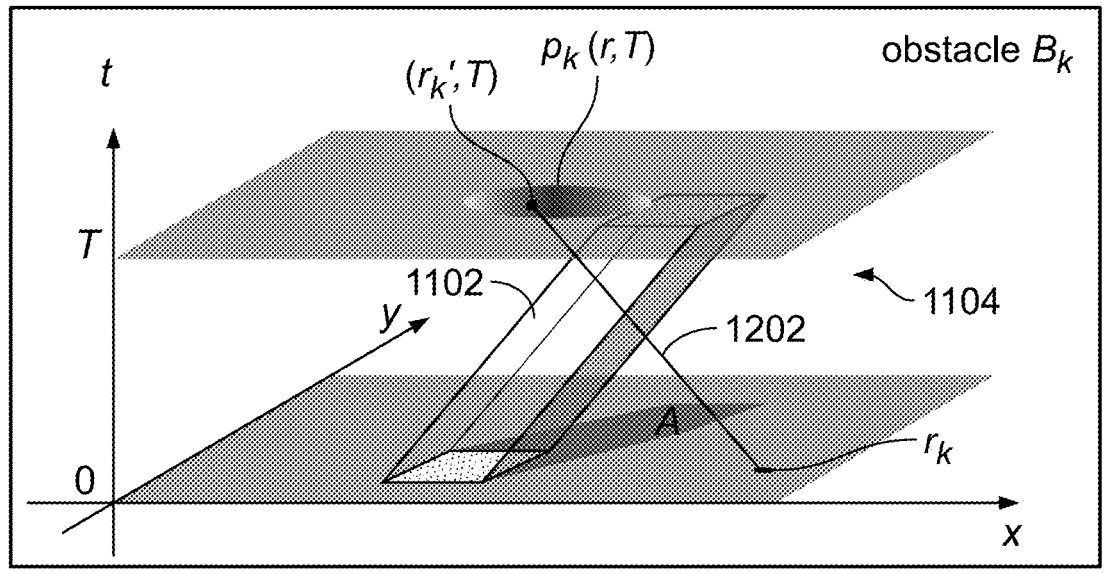
FIG. 12 illustrates certain principles of path projection in the context of a spacetime collision analysis.

As shown in FIG. 12, uncertainty in relation to moving obstacles is accounted for in terms of the uncertainty with which each obstacle's destination can be predicted. The destination of an obstacle means its position (location) at time t=T, i.e. at the end of the time interval over which the motion analysis is performed.

The start of the time interval t=0 is a current time, and it is assumed that the xy position of each obstacle at t=0 (starting position) is known exactly (with zero uncertainty).

For obstacle k, the starting position is denoted $r_k$. The starting position defines a spacetime reference point ($r_k$, 0) for that obstacle on the plane t=0.

It is also assumed that each obstacle travels at constant velocity, i.e. the speed and direction of its motion does not change within the time interval [0, T]. Under this assumption, any obstacle trajectory will be described as a "ray", i.e. a straight line (strictly, half-line) extending upwardly (direction of increasing t) from the reference point ($r_k$, 0) (see FIG. 14 described below). However, the speed and direction is not assumed to be known—hence, in this model, a predicted set of obstacle trajectories is given by the set of rays extending upwardly from the reference point ($r_k$, 0) having different orientations in spacetime. By way of example, FIG. 12 shows an example obstacle trajectory as a ray 1202 extending upwardly from ($r_k$, 0). The ray 1202 intersects the plane t=T at spacetime point ($r'_k$, T), where $r'_k$ denotes the spatial destination of obstacle k if it were to follow the trajectory 1202. Note that, since $r_k$ is known, the ray 1202 is fully defined by the intersection ($r'_k$, T) with the destination plane—hence the uncertainty in the obstacle's trajectory can be fully captured as the uncertainty in the obstacle's destination at t=T.

The uncertainty in the obstacle's destination is captured in a probabilistic obstacle location function defined over the two-dimensional (2D) area of the destination plane t=T. In the present example, this function is a probability density $p_k$(r,T) defined over all possible obstacle destinations in the t=T plane (destination probability density).

Figure 23:
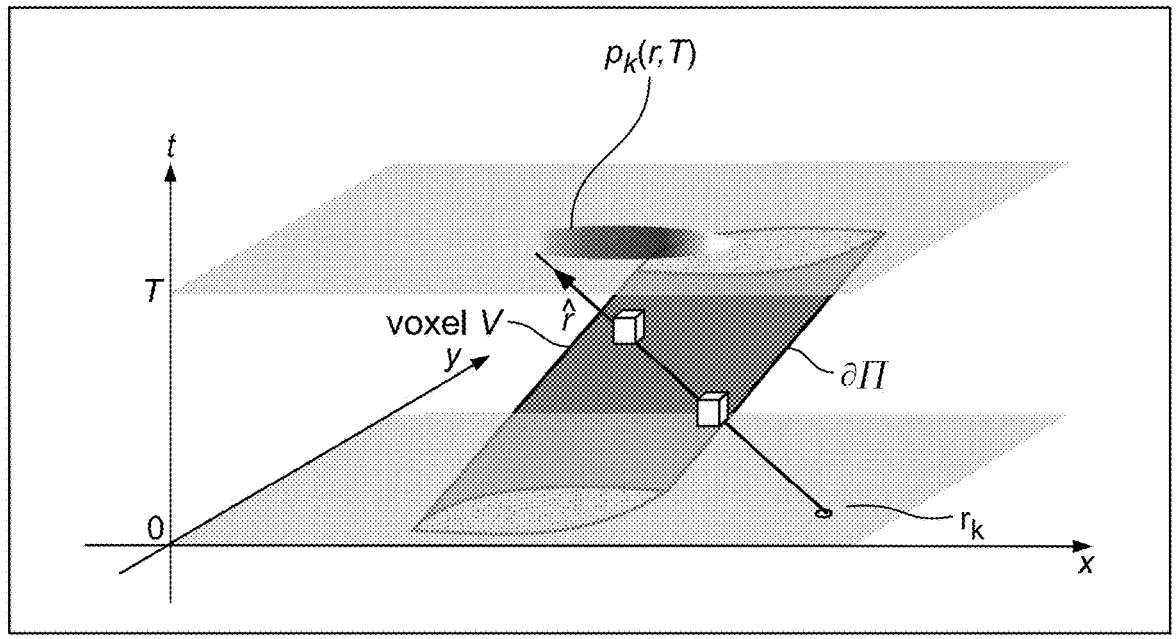

The destination probability density is determined based on the object tracking performed at block A14 in FIG. 23.

Figure 13:
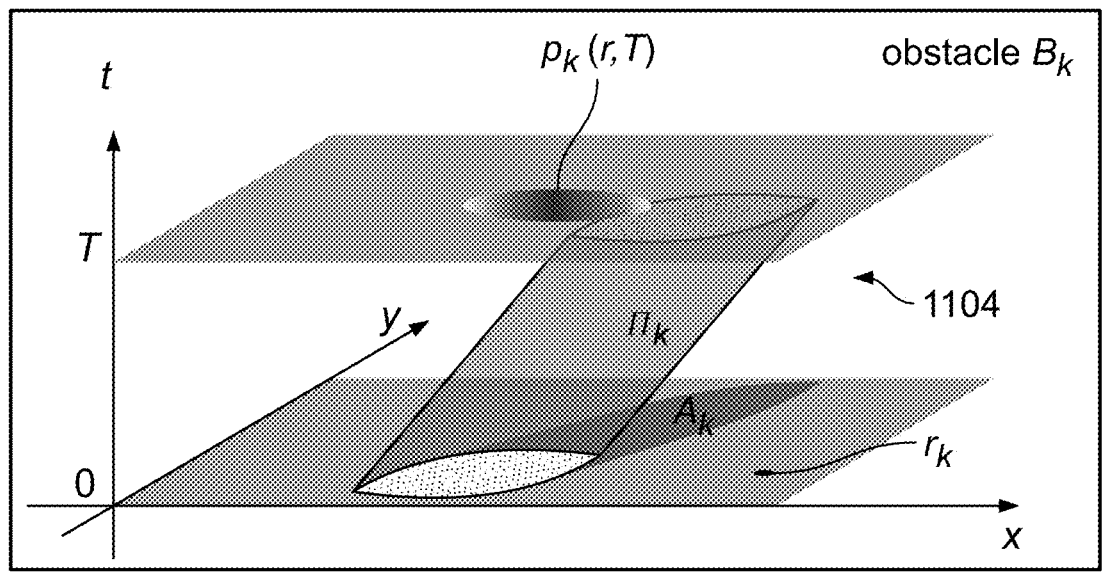
FIG. 13 shows an expanded spacetime tube.

As shown in FIG. 13, in order to account for non-point obstacles, the spacetime tube 1102 can be expanded for obstacle k based on a determined (e.g. measured or assumed) shape of obstacle k. This is achieved by expanding the area of the AV 1102 in the xy-plane, with the expanded spacetime tube being determined as the volume of spacetime swept by the expanded area in the interval [0, T]. The expanded area for obstacle k is denoted $\Pi_k$, and can be determined as the Minkowski sum of the xy AV shape with the xy shape of obstacle $B_k$ as described above. The parallel projection of the expanded tube $\Pi_k$ into the plane t=0 gives the area $A_k$ underlying the tethered obstacle method. This is shown in FIG. 13 for reference, however, it is again noted that this is merely for the sake of comparison—the parallel-projected area is not used as a basis for the dynamic method.

Rather, it is an area $A'_k$ in the destination plane t=T that underlies the dynamic obstacle method.

Figure 14:
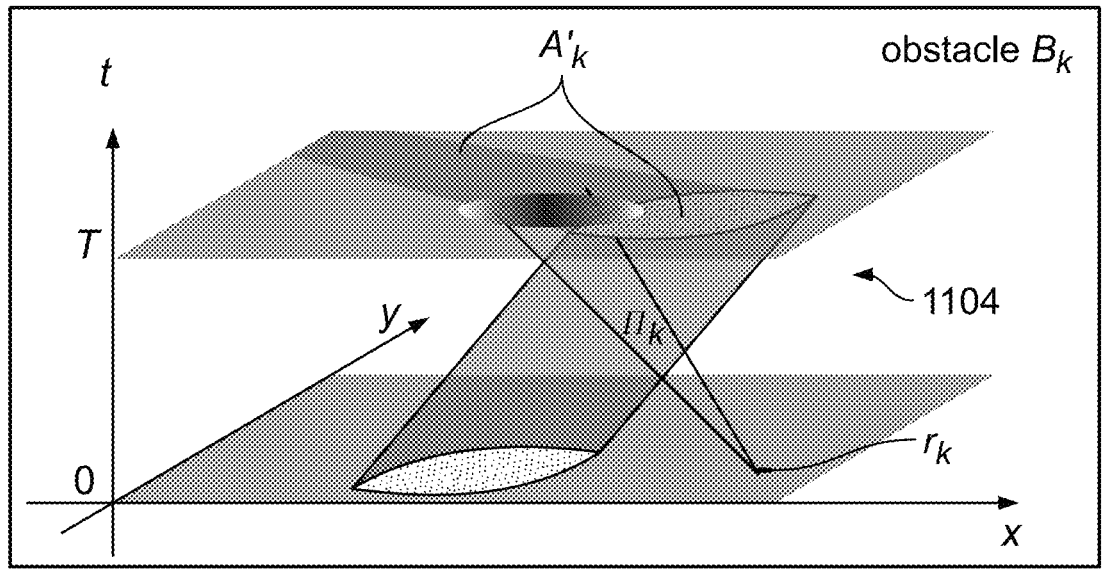
FIG. 14 illustrates certain principles of path projection for an expanded spacetime tube.

As shown in FIG. 14, the area $A'_k$ is the perspective projection (or "shadow") of the spacetime tube $\Pi_k$ onto the destination plane, relative to the reference point ($r_k$, 0) for obstacle k. That is to say, the area obtained by casting rays upwardly from ($r_k$, 0) and projecting $\Pi_k$ onto t=T along those rays. As noted above, the trajectory of obstacle k is assumed to be a ray of unknown orientation cast upwardly from ($r_k$, 0). Therefore, the set of obstacle destinations with the projected area $A'_k$ defines the subset of rays which intersect the expanded spacetime tube $\Pi_k$, and hence the subset of trajectories for obstacle k which result in a collision at some time within the interval [0, T] (a collision occurs whenever the canonical point describing obstacle k intersects the surface of the expanded spacetime tube $\partial \Pi_k$, because this implies the AV and the obstacle are at the same position at the same time)

Figure 15:
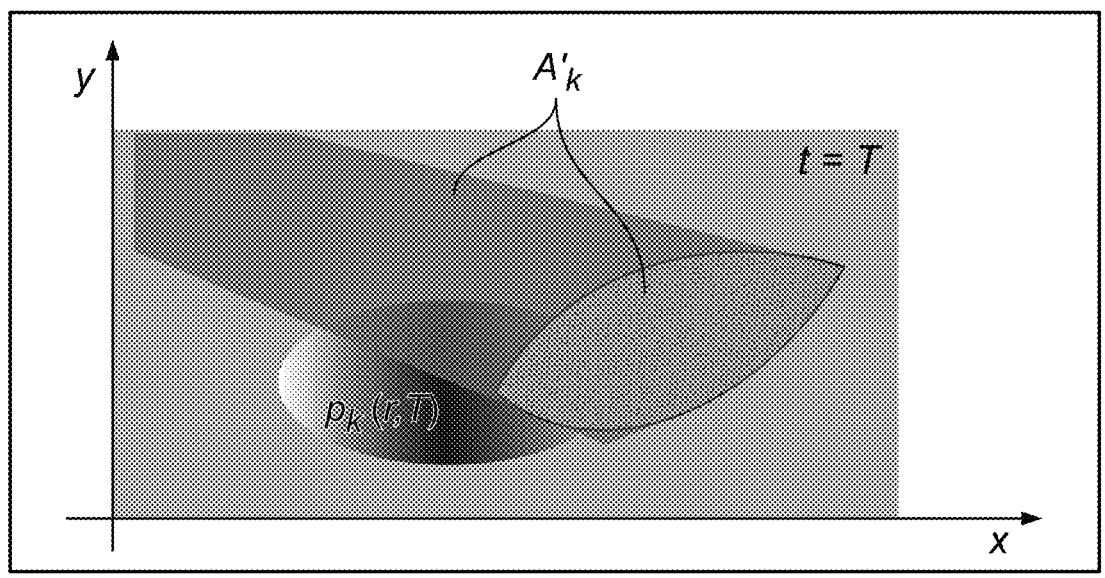
FIG. 15 shows a plan view of a t=T spacetime plane into which an expanded spacetime tube has been projected.

FIG. 15 shows a plan view of the destination plane t=T. For a single obstacle k, the risk of collision with the AV in [0, T] is given by:

$$P_D(k) = \int_{A'_k} p_k(r,T) \quad (2.1)$$

That is, the integral of the destination probability density over the perspective projected area $A'_k$ (in contrast to the tethered method, in which the integral is over the expanded swept area $A_k$). Note, this is still a two-dimensional surface integral with the 2D position r as the only variable—time T is a constant.

As for the tethered method, with multiple obstacles, the total collision risk for a given path is given by:

$$P_D = 1 - \prod_k (1 - P_D(k)) \quad (2.2)$$

where the product term is over all detected obstacles. The total risk of collision for a given path can therefore be computed by computing the integral of (2.1) for each path, and then the outputs as per (2.2). This may be viable in certain contexts, however as for the tethered obstacle method, the complexity scales as O(NK), where N is the total number of paths and K is the total number of obstacles. Hence, for a large number of paths, this requires significant additional compute resources for each additional obstacle in order to complete the necessary computations within the required time frame.

To increase the efficiency, and achieve O(N+K) complexity, the dynamic method is also based on the upper bound on the total collision risk:

$$P_D \leq F_D = \sum_k P_D(k). \quad (2.3)$$

As described above, the tethered obstacle method used the "convolution trick" to aggregate all of the obstacles into a single path-independent functions—G and $G_o$—which can then be re-used for different candidate paths, by (in that case) integrating over the swept area of the path.

The same core principle is applied in the dynamic method, but the path-independent function is different.

Note the terms "path-independent function" and "accumulator" are used interchangeably herein, to describe a function which provides an accumulated measure of collision risk at points within the collision space (2D area for the teethed method; the 3D spacetime volume 1104 for the dynamic method) taking into account all of the K obstacles under consideration. The accumulator is defined such that the total risk of collision along any given path can be computed as an integral (or other aggregation) of the accumulator over (or otherwise based on) an area defined by that path and the known xy shape of the AV. For the tethered method, the area in question is the (non-expanded) swept area A.

For the dynamic method described herein, the path risk is given by the integral of the accumulator over the surface $\partial \Pi_k$ of the expanded spacetime tube $\Pi_k$.

Figure 16A:
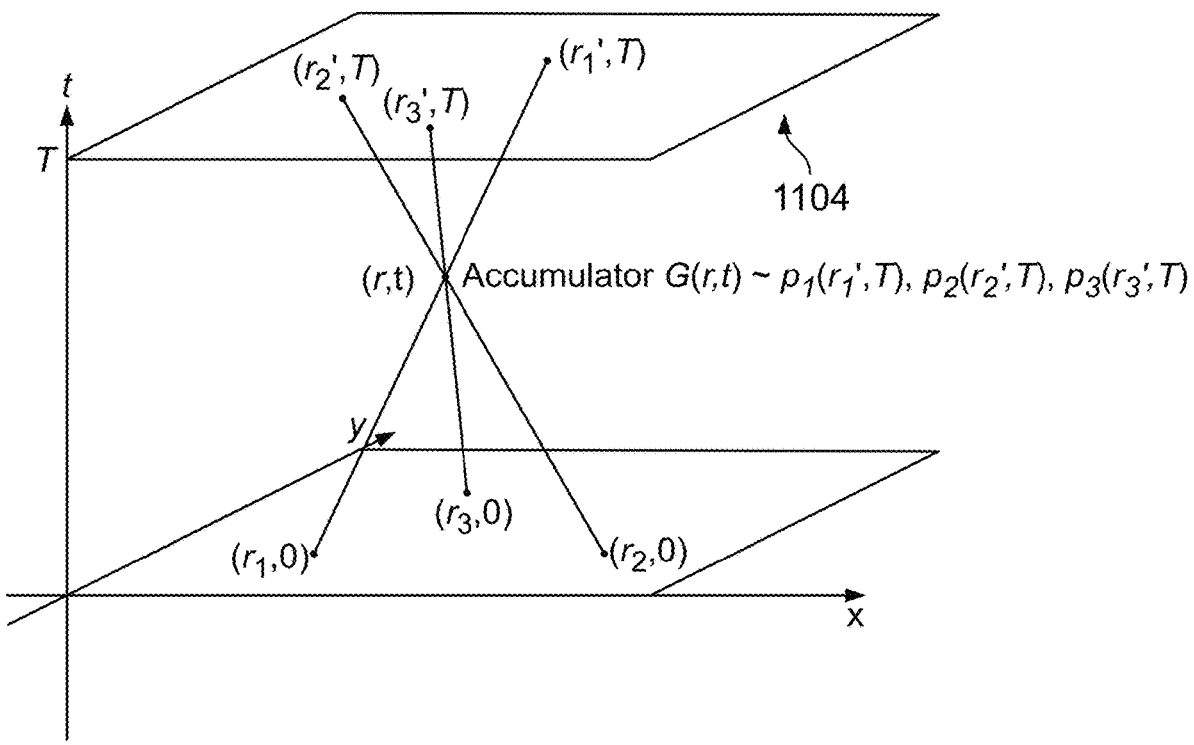
FIGS. 16A and 16B illustrates certain principles of path-independent "accumulators" in the context of a spacetime analysis.
Figure 16B:
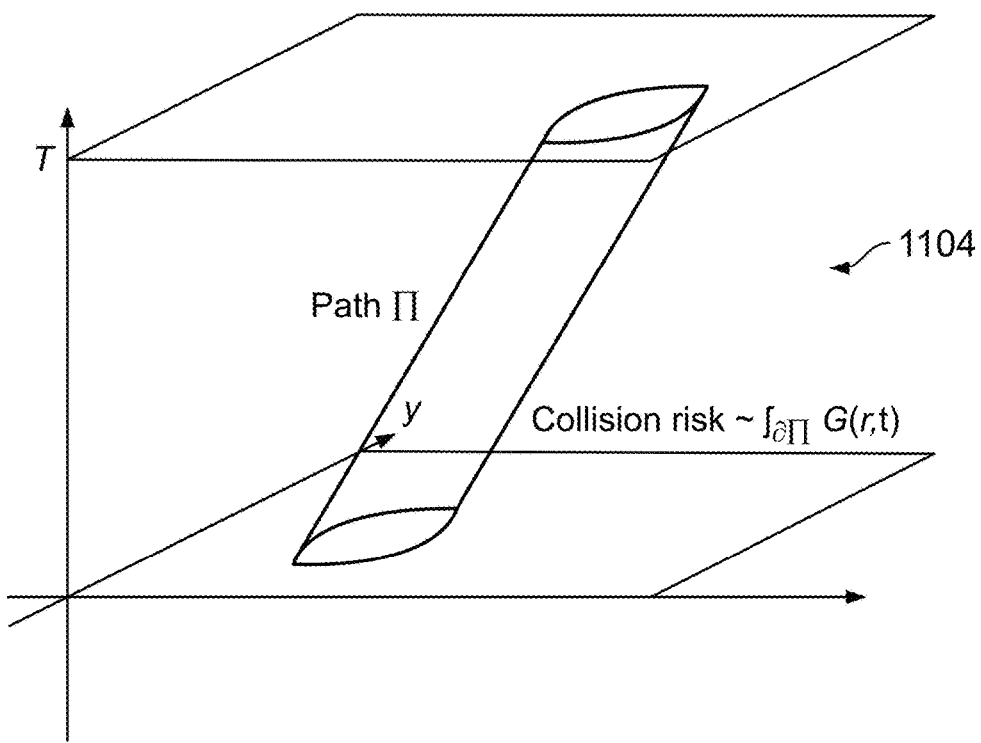

The principles of accumulators in the dynamic method are illustrated in FIGS. 16A and 16B. This considers three obstacles k=1,2,3 merely by way of example. For each obstacle, a reference point ($r_k$, 0) (its starting location at t=0) is known. An accumulator denoted G is defined at every spacetime point in the collision space, where G(r,t) accumulates the contribution to the total collision risk at point (r,t) for all obstacles. The contribution for each obstacle k is assessed based on the destination density function $p_k$ for that obstacle at destination point ($r'_k$,T), that point being the perspective projection of (r,t) onto t=T from the reference point ($r_k$, 0) for obstacle k. That is, ($r'_k$,T) is the intersection, with t=T, of an obstacle trajectory, in the predicted set of obstacle trajectories, defined by ($r_k$, 0) and (r,t)—which, in the present example, is a ray cast from ($r_k$, 0) through (r,t). Physically, this reflects the fact that an obstacle on the trajectory defined by ($r_k$, 0) through (r,t) would end up at destination $r'_k$ at time T.

As illustrated in FIG. 16B, given a spacetime tube Π, the total collision risk for that path, taking into account all obstacles, is estimated by aggregating the accumulator over the surface of the spacetime tube, for example by integrating it over the spacetime tube surface as:

$$\int_{(r,t) \in \partial \Pi} G(r,t). \quad (2.4)$$

Two variants of the dynamic method are described below and are referred to as the tensor field method and voxel method respectively.

In the tensor field method, an accumulated (summed) "obstacle tensor field" accumulator is defined, which is integrated over the surface of each spacetime tube under consideration. In the voxel method, a coarser aggregation over al based on a voxelization of the collision space (this may be referred to as a coarse approximation of the integral of (2.4) herein). As described below, each voxel face in the collision space is projected onto t=T for each obstacle k, and the probability density $p_k$ (r,T) for obstacle k is integrated over the area of the voxel face projection in t=T to obtain an associated probability value, also referred to herein as a "fragment" (in FIG. 16A, if (r,t) is the centre point of the voxel face, the projected voxel face for obstacle k would be a quadrilateral on t=T centred on ($r'_k$,T)—see below). The integral of the accumulator over the surface ∂Π can then be approximated based on a summation of the probability values associated with the voxel faces that approximate the surface ∂Π of the spacetime tube Π.

3. Tensor Method ("FDPR I")

The tensor method allows accumulation over multiple obstacles under the assumption they have the same shape, such that a single expanded spacetime volume Π (expanded by the common obstacle shape) can be considered for each path for those multiple obstacles. Where obstacles have different shapes, safe planning can be achieved by choosing a conservative obstacle shape for the expansion of the spacetime tube 1102, which is large enough to completely contain every obstacle under consideration.

For obstacles with a common shape, $\Pi_k = \Pi$ for each obstacle k, which is the candidate path spacetime tube expanded by the common obstacle shape.

3D fields are defined, for each obstacle k, which can be legitimately summed in order to obtain a path-independent accumulator, which in turn can be integrated over the surface ∂Π.

Figure 17:
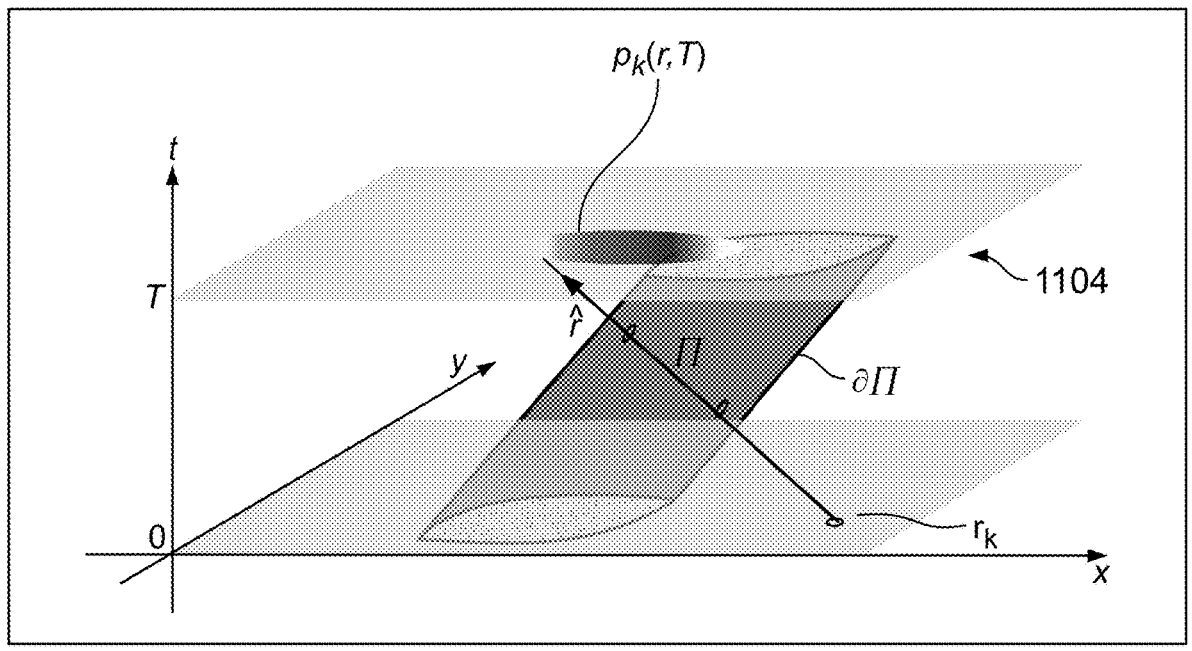
FIGS. 17-19 illustrate the principles of estimating collision risk in a tensor field approach.

With reference to FIG. 17, an estimate of the probability of collision with obstacle k, is given by the integral over surface ∂Π of the AV's space-time tube Π, to accumulate the contribution from $p_k(r'_k,T)$, where ($r'_k$,T) is the point at which a ray from $r_k$, through ∂Π, strikes the t=T plane ($r'_k$ being the obstacle destination for that obstacle trajectory at time t=T). This will give (an upper bound on) the collision probability, as the integral of the accumulator effectively integrates $p_k$(r,T) over the shadow $A'_k$ for each obstacle k simultaneously. This is an upper bound because, for a sufficiently convoluted Π, a ray exiting the spacetime tube Π could re-enter the spacetime tube H and exit again. This is again acceptable, as an upper bound is conservative, as needed for safety.

Figure 18:
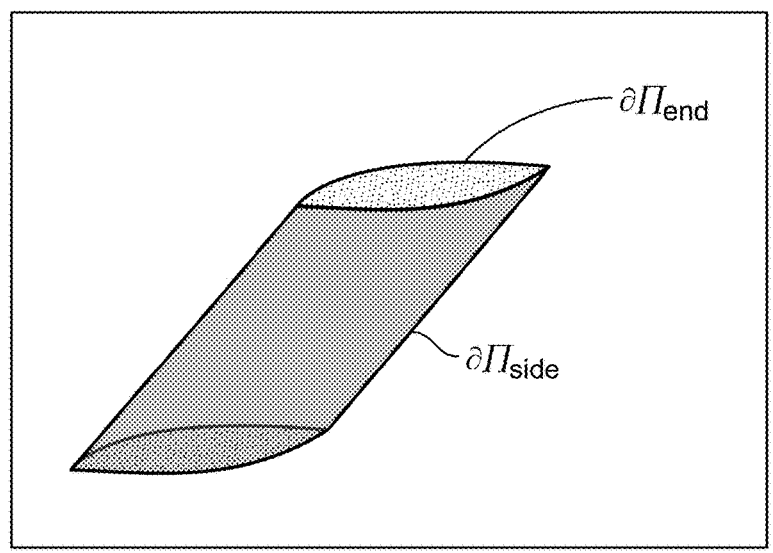

With reference to FIG. 18, first it is assumed that, for all k, the initial position of the obstacle $r_k$ lies outside the spacetime tube H, otherwise the probability of collision is 1.

The spacetime tube H has a side surface $\partial \Pi_{side}$ extending from the plane t=0 through the collision space 1104 to the plane t=T so as to connect those planes, and a top-surface (end cap) lying within the t=T plane. The other end cap at t=0 can be ignored because of the assumption that all $r_k$ lie outside that end cap, hence no rays pass through it. Thus for the present purposes:

$$\partial \Pi = \partial \Pi_{side} \cup \partial \Pi_{end}$$

The integral over surface $\partial \Pi$ is the sum of integrals over the side-surface $\partial \Pi_{side}$ and the end cap of n on the t=T plane, denoted $\partial \Pi_{top}$, so:

$$P_D \leq F_D = P_{side} + P_{end} \quad (3.1)$$

where $P_{side} = \Sigma_k P_{side}(k); P_{end} = \Sigma_k P_{end}. \quad (3.2)$ The top-surface integral is straightforward to compute directly:

$$P_{end} = \int_{\partial \Pi_{end}} p(r,T), \quad (3.4)$$

where $p(r,T) = \Sigma_k p_k(r,T). \quad (3.5)$

In order to determine the side-surface integral, an obstacle tensor filed accumulator is defined in the following manner.

Figure 19:
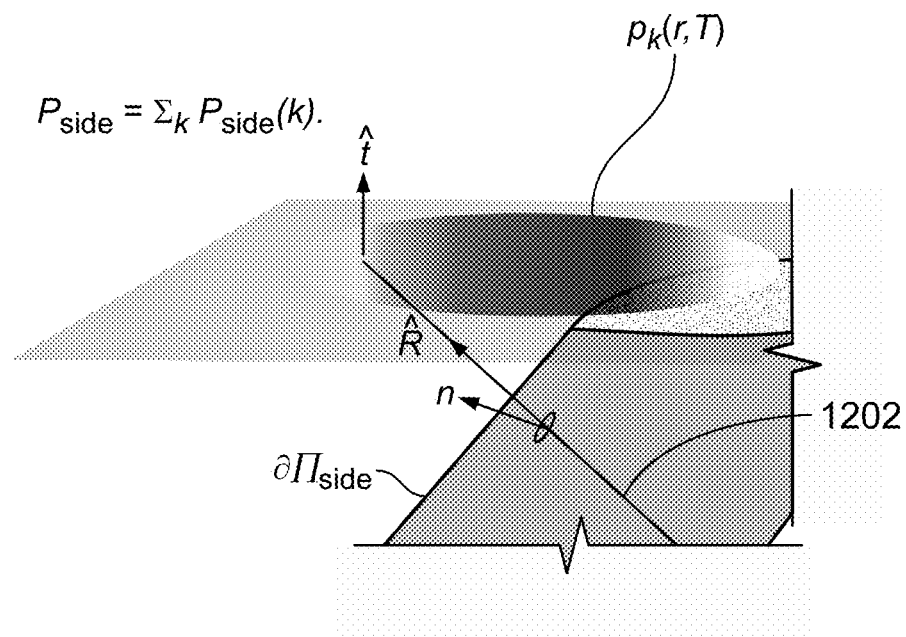

With reference to FIG. 19, the integral over the side-surface $\partial \Pi_{side}$ takes into account projection cosines $\hat{R} \cdot n$ and $\hat{R} \cdot \hat{t}$ where n=n(r,t) is the normal to $\partial \Pi_{side}$ at (r,t), $\hat{t}$ is a unit vector parallel to the time axis (normal to the plane t=T), and $\hat{R}$ is a unit vector along the ray 1202.

To prepare for the surface integral, the probability distribution $p_k(r,T)$ on t=T is extended to $p_k(R)$ in xyt-space where R=(r,t), by propagating it along rays through the reference point $r_k$ on t=0:

$$p_k(R) = p_k(r'_k, T) \quad (3.6)$$

where $(r'_k, T)$ is the perspective projection of R=(r,t) from the reference point $(r_k, 0)$ for obstacle k onto t=T:

$$r'_k = r_k + (r - r_k)\frac{T}{t}. \quad (3.6)$$

The integral over the side-surface can now be expressed in R-space as:

$$P_{side}(k) = \int_{\partial \Pi_{side}} \frac{T}{t}\left(\frac{1}{\hat{R}_k \cdot \hat{t}}\right) p_k(r, t) \, pos(\hat{R}_k \cdot n) \quad (3.8)$$

where $\hat{R}_k = \hat{R}_k(r, t) = \frac{R - (r_k, 0)}{|R - (r_k, 0)|}, \quad (3.9)$ a unit vector in the ray direction in xyt-space.

Here, $\hat{R}_k \cdot n$ and $\hat{R}_k \cdot \hat{t}$ are projection cosines and $pos( \ldots )$ suppresses negative arguments so as to only count rays passing out of $\partial \Pi_{side}$:

$$pos(u) = \begin{cases} u & u > 0 \\ 0 & \text{otherwise} \end{cases}$$

This prevents double counting of rays: any rays which enter the spacetime volume within the interval [0, T] but do not exit it within that interval will intersect the plane t=T within the top-surface $\partial \Pi_{top}$. Such rays are therefore accounted for in the integral over the top-surface $\partial \Pi_{top}$, hence the side-surface integral only needs to include rays which exit the spacetime volume through the side surface $\partial \Pi_{side}$.

The term $$\frac{T}{t}$$

scales for projection onto the t=T plane. Writing (3.8) in terms of a vector field $f_k$:

$$P_{side}(k) = \int_{\partial \Pi_{side}} pos(f_k(r,t) \cdot n) \quad (3.10)$$

where $f_k(r,t) = f_k(r,t)\hat{R}_k$ The "obstacle vector field", $(3.11)$ and $$f_k(r, t) = \frac{T}{t}\left(\frac{1}{\hat{R}_k \cdot \hat{t}}\right) p_k(r, t) \text{ The "obstacle scalar field"}. \quad (3.12)$$

Summing Over Obstacles

Ideally obstacles would be combined in $P_{side} = \Sigma_k P_{side}(k)$ by summing over k in (3.10) to obtain $P_{side}$ in terms of a combined field f(r,t). However, the nonlinearity of pos( . . . ) prevents this. Instead, by approximating pos( . . . ) and extending vector fields $f_k$ to tensor fields $F_{k;}$, obstacle probability distributions combine into one tensor field F as follows. Approximating to 4th polynomial order in u, $$pos(u) \approx Pos(u) = \frac{1}{4}(u+1)^2, u \in [-1,1], \quad (3.12)$$

noting this is an upper bound so pos(u)≤Pos(u), which will ensure that obstacle collision probabilities in (3.10) continue to be upper bounds—which is conservative, as required for safety. Whereas terms of the form pos(e·n) are nonlinear in unit vector e=($e_x, e_y, e_z$), the approximate form pos(e·n) can be expressed as a linear function of a tensor $$\Phi(e) = (1, e_x, e_y, e_t, e_x^2, e_y^2, e_t^2, e_x e_y, e_x e_t, e_y e_t) \quad (3.13)$$

as $Pos(e \cdot n) = \Phi(e) D \Phi(n)^T \quad (3.14)$ where $D = \text{diag}(\frac{1}{4}, \frac{1}{2}, \frac{1}{2}, \frac{1}{2}, \frac{1}{4}, \frac{1}{4}, \frac{1}{4}, \frac{1}{2}, \frac{1}{2}, \frac{1}{2}) \quad (3.15)$ This in turn allows (3.10) to be approximated as $$P_{side}(k) \leq \int_{\partial \Pi_{side}} f_k(r, t) \, Pos(\hat{R}_k \cdot n) \quad (3.16)$$

$$= \int_{\partial \Pi_{side}} F_k(r, t) \, D \, \Phi(n)^\wedge T \quad (3.17)$$

where $F_k(r, t) = f_k(r, t) \, \Phi(\hat{R}_k)$ the "obstacle tensor field". $(3.18)$ By expanding to tensors, linearity with respect to the obstacle tensor has been achieved, which in turn means that summation across obstacles is possible:

$$P_{side} \leq \int_{\partial \Pi_{side}} F(r,t) D \Phi(n)^\wedge T \quad (3.19)$$

where $F(r,t) = \Sigma_k F_k(r,t) \ldots$ The "summed tensor field", $(3.20)$

Here, it can be seen that the summed tensor has the required properties of an accumulator—it accumulates the contribution to collision risk from all obstacles at spacetime points within the collision space, and is path-independent, i.e. independent of any given spacetime tube; once computed, the summed obstacle field can be re-used for different paths, without having to re-compute it.

Path-dependency is only introduced when the summed tensor field is integrated as per (3.19) for a given spacetime tube—which comes from the fact that the integral is over $\partial \Pi_{side}$ and also the term $\Phi(n)^T$ which depends on the normal, $n=n(r,t)$, to the side-surface $\partial \Pi_{side}$ at $(r,t)$. The summed tensor field itself is path-independent.

Figure 20:
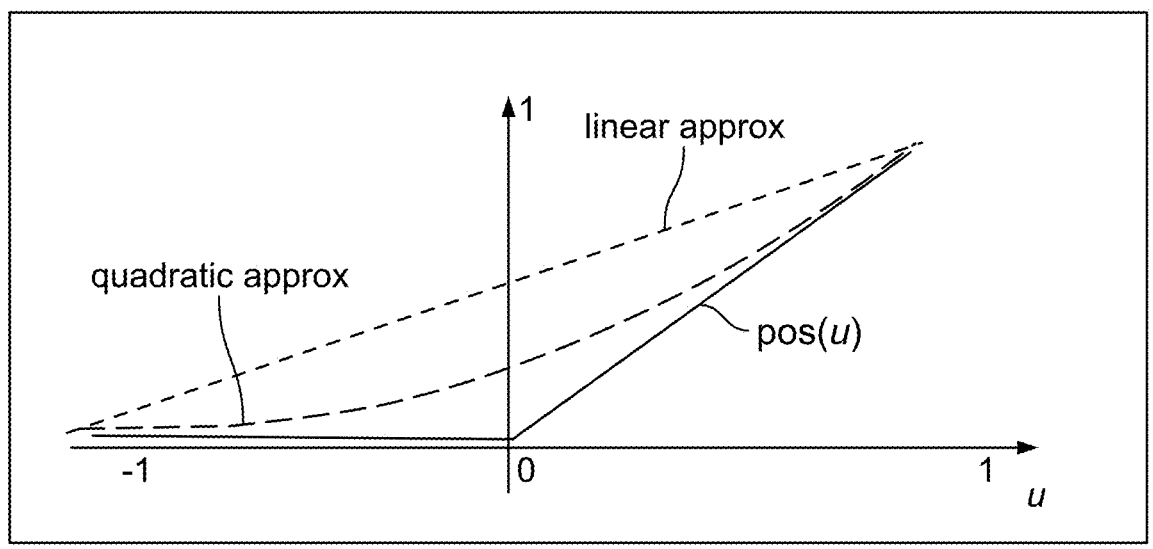
FIG. 20 compares different approximation of the function pos( . . . ).

Although F is a ten-component tensor, only nine components need to be stored for each spacetime point $(r,t)$ for which it is computed, as $F_1 = F_5 + F_6 + F_7$. A coarser approximation of pos( . . . ) could be used to yield a tensor field of lower dimensionality, further reducing the storage space required to store it. By way of illustration, FIG. 20 compares the quadratic approximation of (3.12) with a linear approximation of pos( . . . ).

It is important to note that a number of the equations given above are provided in order to explain the principles of the tensor method. However, only a subset of the mathematical expressions given above actually describe computations that are performed in carrying out the tensor method. The algorithmic steps of the tensor method are given in Table 1 below, which indicates which of the mathematical expressions above actually correspond to algorithmic operations.

within the collision space (again, only a selection of the voxels that make-up the spacetime tube Π are shown).

Hence, in this model, $\partial \Pi_{side}$ is represented a discrete set of voxel faces that make up the side surface, and $\partial \Pi_{top}$ is represented as a discrete set of voxel faces lying in the t=T plane.

The notation $c \in \partial \Pi$ is used to denote a voxel face c on the surface $\partial \Pi$ of the spacetime volume Π.

Note that, in FIG. 22 and the later figures, the ray from $(r_{k,0})$ though $(r,t)$ is denoted $\hat{r}$, where:

$$\hat{r} = \hat{R}_k$$

as defined above.

In FIG. 23, a specimen ray $\hat{r}$ from the start position of the obstacle to the destination plane t=T exits the spacetime tube through voxel V.

Figure 24:
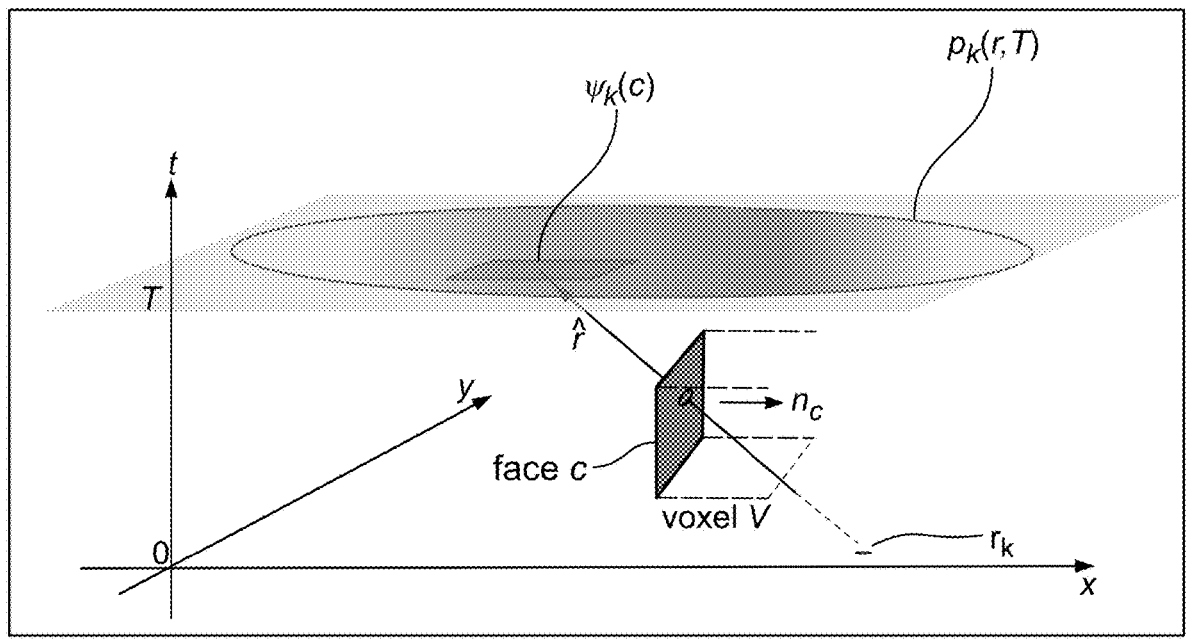

FIG. 24 shows an expanded view, in which it can be seen that the ray $\hat{r}$ exits voxel V through vertical face c (the exit face for ray $\hat{r}$). The perspective projection of the exit face c, from $(r_k, 0)$ onto the destination plane t=T, is a quadrilateral lying in the destination plane t=T, denoted $\psi_k(c)$. That is, face c projects from the starting point $r_k$ for obstacle k on the starting plane t=0 to the quadrilateral $\psi_k(c)$ on the destination plane t=T. In general, the side surface $\partial \Pi$ may be made up of both vertically and horizontally aligned voxel faces, and a ray could exit through any of these.

To allow systematic consideration of voxel faces, a convention is adopted herein by which a "standard" normal $n_c$ to any given voxel face c is defined as lying in the direction

TABLE 1 the algorithmic steps of FDPR I method.

Given:
    a planning interval $0 \le t \le T$,
    a common obstacle shape B, and moving obstacles k = 1, . . . , K,
    each obstacle in uniform motion from $r_k$ to an end point drawn randomly from $p_k(r,T)$,
    a robot path expressed as a space-time tube Π (not containing any $r_k$), from a set $\mathcal{H}$ of N possible paths,
Compute a bound $F_D$ on the total collision risk $P_D$ with time complexity O(K + N), as follows.
Preparation [summing over K obstacles]
1. Compute summed destination distribution p(r,T) as in (3.5)
2. Compute vector fields $f_k(r,t)$ for each obstacle, as in (3.11)
3. Computer obstacle tensor fields $F_k(r,t)$ as in (3.18) and sum them to obtain F(r,t).
For each path $\Pi \in \mathcal{H}$ [iterate over N paths]
    1. Extract from Π the surfaces $\partial \Pi_{end}$ and $\partial \Pi_{side}$
    2. Compute the normal field n over $\partial \Pi_{side}$
    3. Compute $F_D = \int_{\partial \Pi_{end}} p(r,t) + \int_{\partial \Pi_{side}} F(r,t) D\phi(n)^T$ Returning to FIG. 26, the method can be implemented in the same way as described above with reference to this figure, but with steps S12 and S13 replaced with the preparations steps 1-3 given in table 1 (computation of summed distribution and summed tensor field), with $F_D$ being computed based thereon at step S14.

4. The Voxel Method ("FDPR II")

Figure 21:
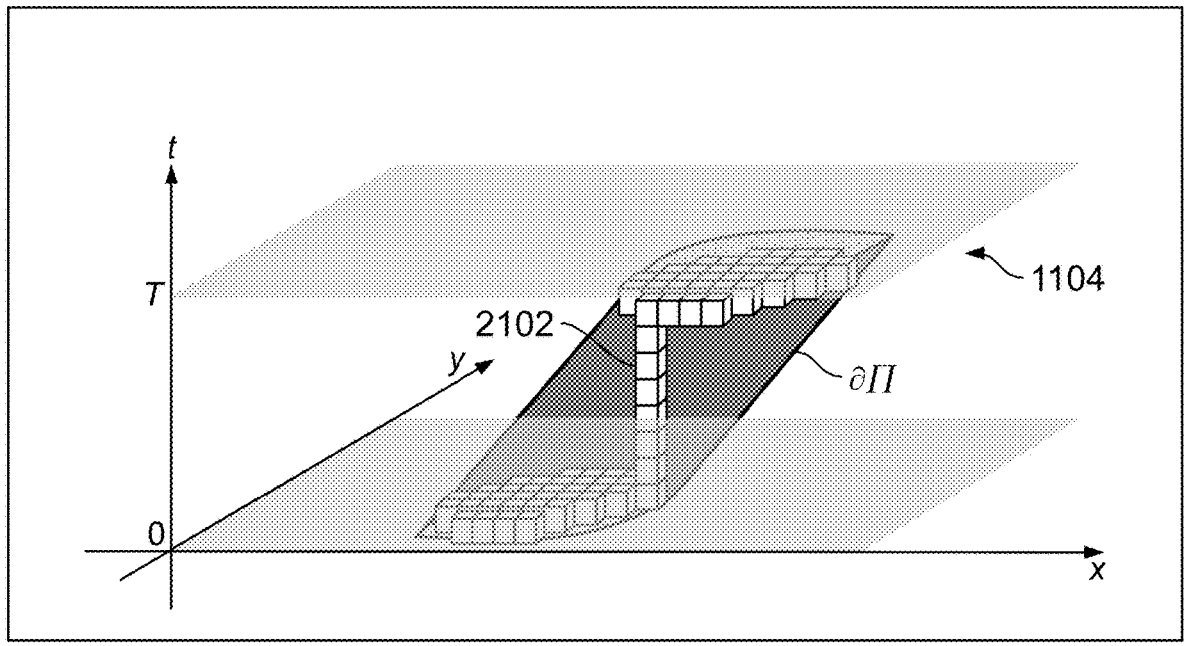
FIG. 21 shows a voxelized spacetime tube.

As illustrated in FIG. 21, in the voxel method, the collision space 1104 is discretized as a set of predefined voxels (volume elements) 2102, which are spacetime cuboids arranges as a 3D array. Note that only a selection of the voxels are shown—however a 3D voxel grid is defined over the whole collision space 1104.

Figure 22:
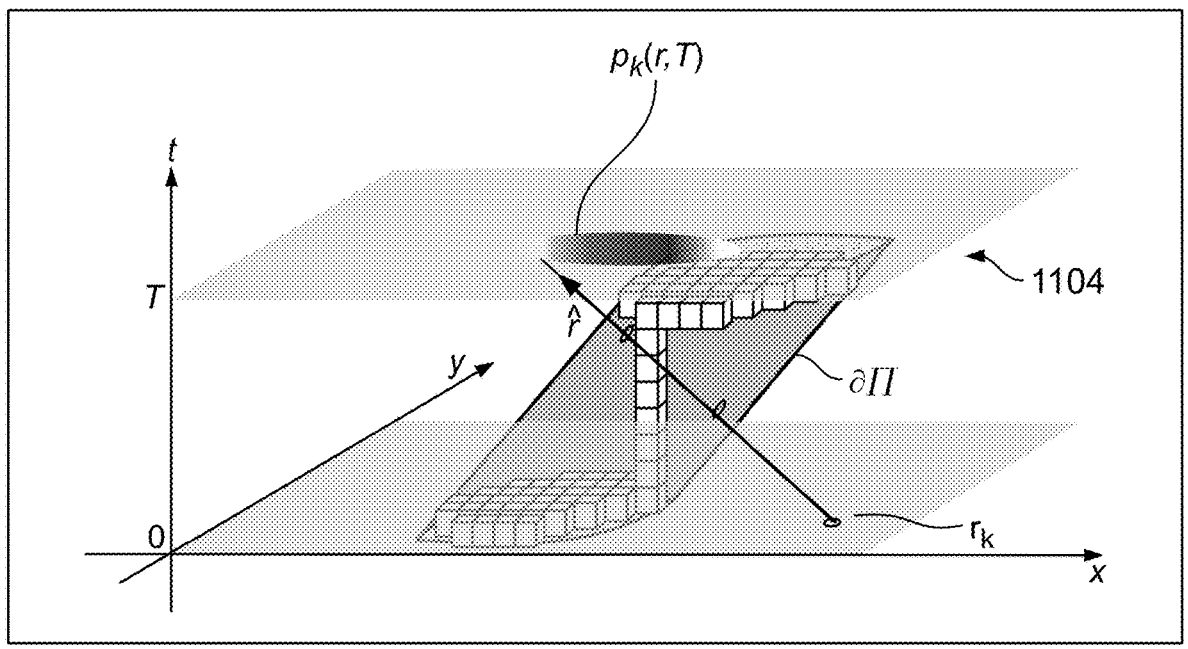
FIGS. 22-24 illustrate principles of path projection in a voxel context.

As shown in FIG. 22, obstacle k is once again represented in terms of its starting location $r_k$ at t=0 and the probability (density) distribution $p_k(r,T)$ over its destination at time t=T. The spacetime tube Π is represented as a subset of the voxels of the positive coordinate axis—i.e. in the +x, +y, or +t direction depending on the orientation of the voxel face c. Hence, the standard normal $n_c$ to the exit face c in the example of FIG. 24 lies in the positive x direction.

Within this framework, collision risk can be computed from voxels as follows.

Using the voxel representation of the spacetime volume Π, the risk $F_D$ is computed principally by summing up over the voxel faces that comprise the boundary of Π (i.e. the surface $\partial \Pi$). As in (3.1), $F_D$ is a sum of the end component $P_{end}$ which could easily be computed as in the tensor method or based on voxels as described below. The side component $P_{side}$ is computed from voxels as follows. For each obstacle k the side probability is given by:

$$P_{side}(k) = \Sigma c \in \partial \Pi_{side} q_k(c, v(c, \partial \Pi)), \quad (4.1)$$

where the sum is over voxel faces c on the side-surface $\partial\Pi_{side}$ of the voxelized spacetime tube $\Pi$, and $q_k(c, v)$ is a "fragment" of collision probability for a face c is defined as:

$$q_k(c, v) = \begin{cases} \int_{r \in \psi_k(c)} p_k(r, T) & \text{if } (R_c - (r_k, 0)) \cdot vn \geq 0 \\ 0 & \text{otherwise} \end{cases} \quad (4.2)$$

where suffix $v \in \{+1, -1\}$ denotes the direction of the "outward" normal from voxel face c (i.e. extending outwardly from the surface $\partial\Pi$ of the spacetime tube $\Pi$) relative to the standard normal $n_c$ in the positive coordinate direction. In other words, $v=+1$ if the outward normal from that voxel face is aligned with the relevant coordinate axis (x, y or t) and $v=-1$ if the outward normal is anti-aligned with the relevant coordinate axis.

In (4.2), $R_c$ denotes the centre point of voxel face c, which is a point in spacetime.

The integral in (4.2) can be efficiently computed using integral images. Integral images are known in the field of computer vision and provide an efficient way of generating the sum of values in a rectangular subset of a grid. These are well-understood in the context of the known Viola-Jones framework, therefore further details are not discussed herein.

Note, for faces on $t=T$, $\psi_k(c)=c$ and $v=1$, hence the summation over the end-surface can be expressed as:

$$P_{end}(k) = \Sigma c \in \partial\Pi_{end} q_k(c, v(c, \partial\Pi)). \quad (4.3)$$

noting that the fragment $q_k(c, v)$ is always $\int_{r \in \psi_k(c)} p_k(r,T)$ for faces on $t=T$.

It is now possible sum over obstacles, and achieve O(N+K) complexity as before, without repeating the summation over obstacles for each path to be evaluated, since it follows from (4.1) and (4.2) that:

$$P_{side} = \Sigma_k P_{side}(k) = \Sigma_k \Sigma_{c \in \partial\Pi_{side}} q_k(c, v(c, \partial\Pi)), \quad (4.4)$$

so $$P_{side} = \Sigma_{c \in \partial\Pi_{side}} q(c, v(c, \partial\Pi)), \quad (4.5)$$

where $$q(c,v) = \Sigma_k q_k(c,v) \text{ for all } c, \text{ for } v=\pm1, \quad (4.6)$$

Note that the fragment-sums $q(c, v)$ may be pre-computed for all c in the voxel grid, for both values $v=\pm1$, without reference to any particular space-time volume $\Pi$.

Hence, q(c, v) is a valid accumulator, which can be summed over the surface of any given voxelized spacetime tube, in order to compute the collision risk for that path.

All projections $\psi_c(k)$ can be prepared offline and stored in efficiently by computing and storing a fixed table of projections each denoted $\psi(c)$. To compute the fixed table, all voxel faces in the collision space are projected onto $t=T$ from an arbitrary reference point $r_o$ in $t=0$. In order to compute $\psi_k(c)$ for a desired reference point $(r_k, 0)$, each pre-computed projection $\psi(c)$ in the fixed table of projections can simply be translated in the $t=T$ plane to obtain the corresponding face projection $\psi_k(c)$ for desired reference point $r_k$ as:

$$\psi_k(c) = \psi(c) + (r_k - r_o)$$

provided the $r_k$ are restricted to lie on grid points of the voxel grid on $t=0$.

The precomputation of summed probability fragments q(c, v) can be performed at the start of execution, or as the paths are evaluated and cached on the fly. In any event, once computed, they are shared by all obstacle-groups.

The voxel-based FDPR algorithm is similar to the tensor field version FDPR I, but with different preparation steps, and the final, per-path step changed to become simply:

Compute $F_D = \Sigma_{c \in \partial\Pi} q(c,v)$ where $\partial\Pi = \partial\Pi_{side} \cup \partial\Pi_{end}$.     3.

Unlike the previous tensor version FDPR I, the voxel-based method is O(N+K) even for a set of K obstacles which do not share the same deterministic shape, i.e., they have different $\Pi_k$. This is because the pre-computation of voxel projections can provide a speed-up of the online algorithm even when the obstacle shape, and hence the expanded spacetime volume $\Pi_k$, is different for different obstacles k.

A further speed up can be attained where a group of obstacles share the same obstacle shape (which may be an assumed or modelled shape), because in that event, even more computations can be re-used for different obstacles. Where some obstacles share the same shape, one group of obstacles with a common shape can share the same $\Pi_k$. The per-group work is the identification of all $c \in \partial\Pi$, for the $\Pi$ shared by that group, and the computation of $v(c, \partial\Pi)$ for each $c \in \partial\Pi$.

As before, it is noted that a number of the mathematical expressions set out above are given by way of explanation of the principles of the voxel method. Only a subset of these expressions actually correspond to computations that are performed in carrying out the voxel method.

Table 2 below summarized the algorithmic steps that are carried out, with reference to the subset of equations that correspond to computations performed in carrying out those steps.

TABLE 2 algorithmic steps of FDPR II method.

Given: a planning interval $0 \leq t \leq T$,
    obstacle shapes $B_k$, and moving obstacles $k = 1, \ldots, K$, in uniform motion from $r_k$ to an end point drawn randomly from $p_k(r,T)$,
    robot paths, each expressed as space-time tubes (not containing any $r_k$), from set $\mathcal{H}$ of N possible paths,
Compute a bound $P_D$ on the total collision risk $P_D$ with the time complexity O(K + N), as follows.
Prep [once for all, setting upthe algorithm for a given voxel grid]
    Precompute table of projections $\psi(c)$
Prep [summing over $k = 1, \ldots, K$ obstacles]
    1. Translate the $\psi(c)$ to $r_k$, to form the $\psi_k(c)$, for each obstacle k.
    2. For all c, and $v = \pm1$, compute $q_k(c,v)$ as in (4.2), and sum them to obtain q(c,v).
For each path $\Pi \in \mathcal{H}$ [iterate over N paths]
    1. Determine the set of boundary faces $c \in \partial\Pi$.
    2. Compute the outward normals at each $c \in \partial\Pi$, and hence compute the $v(c,\partial\Pi)$.
    3. Compute $F_D = \Sigma_{c \in \partial\Pi} q(c, v(c,\partial\Pi))$ Returning to FIG. 26, the method can be implemented in the same way as described above with reference to this figure, but with steps S12 and S13 replaced with the preparations steps 1-3 given in table 2 (computation of voxel face projections $\psi(c)$ and $\psi_k(c)$), with $F_D$ being computed based thereon at step S14.

5. Dynamic Obstacles—Direct Integration Method

It is emphasised that the use of a path-independent accumulator is optional for the dynamic method. A viable approach is to compute $F_D$ directly, by actually computing each of the individual obstacle collision probabilities $P_D(k)$ for each obstacle k and then summing them to obtain $F_D$ as in equation (2.1), or even computing the product of equation (2.2) that $F_D$ is linearly approximating. In that event, $P_D(k)$ is computed by projecting the spacetime volume Π onto the t=T plane, and computing the integral of $p_k(r,T)$ over the projected area.

6. Extensions

Although in the above, it is assumed that the starting position $r_k$ of each obstacle k at t=0 is known exactly, this is not a pre-requisite. In the case that there is uncertainty in the starting position, a probability distribution over starting positions can be defined for obstacle k:

$$p'_k(r_k, 0).$$

The collision risk for a particular path can for example be computed by sampling possible starting points from this collision $\{r_k\}$ for each obstacle, and the above steps can be carried out for each possible combination of obstacle starting points to determine a collision risk for each combination. The total collision risk is then given by the collision risk for each combination for obstacle starting points and the probability of that combination of starting points.

Moreover, whilst in the above, obstacles are assumed to follow straight-line trajectories in spacetime (rays), this is not essential. The obstacle trajectories in the predicted set of obstacle trajectories could have a curved spacetime geometry (physically corresponding to accelerating obstacles). The same principles as above apply, only now the projection of a point (r,t) in spacetime onto t=T becomes the intersection, with the destination plane t=T, of a curved obstacle spacetime trajectory (rather than a ray) extending from ($r_k$, 0) and passing through (r,t).

At the hardware level, the on-board computer system A1 of the AV comprises execution hardware capable of executing algorithms encoded in software (computer programs) to carry out the above functions. Whilst the execution hardware can be general purpose or special purpose execution hardware, or any combination thereof, it will generally comprise one or more processors such as central processing units (CPUs) and which may operate in conjunction with specialized hardware such as, but not limited to, accelerators (e.g. GPU(s)), field programmable gate-arrays (FPGAs) or other programmable hardware, and/or application-specific integrated circuits (ASICs) etc. Given the need to perform complex data processing operations, often using sophisticated and complex ML/AI models, with sufficient accuracy and speed (often in real-time) to ensure safe and reliable operation, the on-board computer system may be highly sophisticated, possibly with specialized computer hardware tailored to implement the models and algorithms in question. Particularly given the speed at which innovation is progressing in the field of AI, it will be appreciated that the architecture of the AV on-board computer system A1 at both the hardware level and the functional/software level may take numerous forms. Herein, functional components and the like embodied in a computer system—such as the data processing component A2, prediction component A4 and AV planner A6—are high-level representation of particular functionality implemented by the computer system, i.e. functions performed by whatever (combination of) general purpose and/or specialized hardware of the computer system that is appropriate in the circumstances. As noted, the invention also contemplates an off-board simulation environment where similar code may be executed on off-board computer hardware.

Annex A

---

Algorithm 1: FPR algorithm for the bound on collision risk given N paths, and K obstacles.

Data: N instances of path A, $B_{1:K} \cdot p_{1:K}(r)$, $\sigma = 1$
Result: $F_D$
// Compute $G_\sigma$
for k in 1 to K do
  | $\partial B_{k,\sigma}(r) = |\nabla g_\sigma(r) * I_{B_k}(r)|$
end
$G_\sigma(r) = \frac{1}{2}\Sigma_{k=1}^K \partial B_{k,\sigma}(r) * p_k(r)$
// Compute G $$G(r) = \sum_{k=1}^K \frac{1}{\text{area}(B_k)} I_{B_k}(r) * p_k(r)$$

for each A do
  | // Compute $\partial A_\sigma$
  | $\partial A_\sigma(r) = |\nabla g_\sigma(r) * I_A(r)|$
  | // Integrate over a box around A with margins $4\sigma$
  | $F_D = \int_{\mathbb{R}^2} \partial A_\sigma(r) G_\sigma(r) + I_A(r) G(r)$
end

---

The invention claimed is:

1. A computer-implemented method of planning a path for a mobile robot in a presence of a set of obstacles, the method comprising:
   computing for each obstacle a probabilistic obstacle position distribution;
   computing at least one path-independent function as a combination of the probabilistic obstacle position distributions;
   for at least one candidate path, determining an upper bound on a total probability of obstacle collision along that path, by aggregating the path-independent function based on an area defined by the candidate path and a mobile robot shape, wherein the path-independent function is independent of the candidate path;
      wherein the defined area is a surface of a spacetime tube defined by the candidate path and the mobile robot shape, and the path-independent function is integrated or otherwise aggregated over that surface;
      wherein the spacetime tube is determined as a set of spacetime voxels, wherein the path-independent function is determined by projecting faces of the voxels into a spacetime plane for each obstacle and integrating the probabilistic obstacle position distribution for that obstacle over each projection of the voxel face for that obstacle to compute a probability value for that voxel face, and wherein the path-independent function is aggregated over the surface of the spacetime tube by summing the probability values computed for the voxel faces; and
   based on the at least one candidate path, planning a path for the mobile robot and maneuvering the mobile robot along the planned path.

2. The method of claim 1, wherein:
   for each of a plurality of candidate paths, an upper bound on the total probability of obstacle collision along that path is determined, by aggregating the path-independent function based on an area defined by that candidate path and the mobile robot shape, wherein the upper bound is computed for each candidate path without recomputing the path-independent function; and planning the path comprises selecting, from the plurality of candidate paths based on the upper bounds calculated for each of the plurality of candidate paths, the path for navigating the mobile robot through the set of obstacles.

3. The method of claim 2, wherein all of the candidate paths are from a common start point to a common endpoint.

4. The method according to claim 3 wherein the upper bound or a risk of collision is provided as a safety parameter, and the method comprises receiving a threshold for safety and deselecting any of the candidate paths which do not satisfy the threshold for safety.

5. The method of claim 1, wherein the upper bound for the or each candidate path is an upper bound on the sum of individual obstacle collision probabilities along that path, but is computed without determining any of the individual obstacle collision probabilities, and instead by aggregating the path-independent function over the defined area for that path.

6. The method of claim 1, wherein the defined area over which the path-independent function is aggregated is a swept area A defined in two-dimensional space by the candidate path and the mobile robot shape.

7. The method of claim 6, wherein the path-independent function is determined as $$G_\sigma = \tfrac{1}{2}\Sigma_k \partial B_{k,\sigma} * p_k$$

where $\partial B_{k,\sigma}$ is a delta-function ridge along a bounding contour of a shape $B_k$ of the obstacle k and $p_k$ is the probabilistic obstacle position distribution for the obstacle; k and wherein the path-independent function $G_\sigma$ is aggregated as $$\int \partial A_\sigma(r) G_\sigma(r)$$

where $\partial A_o(x)$ approximates a delta-function ridge along a bounding contour of the swept area A; or $$G = \Sigma_k \lambda_k I_{B_k} * p_k$$

where, $$\lambda_k = \frac{1}{\text{area}(B_k)},$$

$I_{B_k}$ is an indicator function of a shape Bk of an obstacle k and $p_k$ is the probabilistic obstacle position distribution for the obstacle, k wherein G is aggregated as $$\int I_A(r) G(r)$$

wherein $I_A$ is the indicator function for the swept area A.

8. The method of claim 1, wherein the spacetime tube is defined by the candidate path and an expanded mobile robot shape, the expanded mobile robot shape being defined by the mobile robot shape and an obstacle shape.

9. The method of claim 1, wherein the upper bound for each candidate path is an upper bound on the sum of individual obstacle collision probabilities along that path, but is computed without determining any of the individual obstacle collision probabilities, and instead by integrating the path-independent function over the defined area for that path.

10. A data processing system configured to plan a path for a mobile robot and comprising:
a computer; and
memory holding computer code which when executed by the computer carries out a method of planning a path for a mobile robot in a presence of a set of obstacles; the method comprising:
computing for each obstacle a probabilistic obstacle position distribution;
computing at least one path-independent function as a combination of the probabilistic obstacle position distributions;
for each of a plurality of candidate paths, determining an upper bound on a total probability of obstacle collision along that path, by aggregating the path-independent function based on an area defined by the candidate path and a mobile robot shape, wherein the path-independent function is independent of the candidate path, and, wherein the upper bound is computed for each candidate path without recomputing the path-independent function,
wherein the defined area is a surface of a spacetime tube defined by the candidate path and the mobile robot shape, and the path-independent function is integrated or otherwise aggregated over that surface,
wherein the spacetime tube is determined as a set of spacetime voxels, wherein the path-independent function is determined by projecting faces of the voxels into a spacetime plane for each obstacle and integrating the probabilistic obstacle position distribution for that obstacle over each projection of the voxel face for that obstacle to compute a probability value for that voxel face, and wherein the path-independent function is aggregated over the surface of the spacetime tube by summing the probability values computed for the voxel faces;
selecting, from the plurality of candidate paths based on the upper bounds calculated for each of the plurality of candidate paths, a path for navigating the mobile robot through the set of obstacles; and
based on the path selected from the plurality of candidate paths, maneuvering the mobile robot along the path selected from the plurality of candidate paths.

11. A computer program product comprising instructions embodied in a non-transitory computer readable medium which, when executed by a computer, cause the computer to carry out a method of planning a path for a mobile robot in a presence of a set of obstacles, the method comprising:
computing for each obstacle a probabilistic obstacle position distribution;
computing at least one path-independent function as a combination of the probabilistic obstacle position distributions;
for each of a plurality of candidate paths, determining an upper bound on a total probability of obstacle collision along that path, by aggregating the path-independent function based on an area defined by the candidate path and a mobile robot shape, wherein the path-independent function is independent of the candidate path, and, wherein the upper bound is computed for each candidate path without recomputing the path-independent function,
wherein the defined area is a surface of a spacetime tube defined by the candidate path and the mobile robot shape, and the path-independent function is integrated or otherwise aggregated over that surface, determining projections, onto a second spacetime plane defined by a second time, of points or regions within a spacetime volume based on position information for each obstacle at a first time and a predicted set of obstacle trajectories, the first time defining a first spacetime plane separated from the second spacetime plane by the spacetime volume, wherein the spacetime tube has a side-surface lying within the spacetime volume and extending from the first spacetime plane to the second spacetime plane, wherein at least some of said points or regions lie on the side-surface of the spacetime tube, wherein the upper bound is determined, between the first and second times, based on the probabilistic obstacle position distribution for the obstacle, as applied to the projections of the side-surface points or regions;

selecting, from the plurality of candidate paths based on the upper bounds calculated for each of the plurality of candidate paths, a path for navigating the mobile robot through the set of obstacles; and based on the path selected from the plurality of candidate paths, maneuvering the mobile robot along the path selected from the plurality of candidate paths.

12. The computer program product of claim 11, wherein projections of points or regions within the spacetime volume, onto the second spacetime plane, are determined for each of multiple obstacles based on the predicted set of obstacle trajectories and position information for that obstacle at the first time; and wherein a risk of collision is estimated for the candidate path based on a probabilistic obstacle position distribution $p_k$ for each obstacle k as applied to the projections of points or regions on the side-surface of the spacetime tube as determined for that obstacle, wherein a path-independent function is computed at each of the points or regions within the spacetime volume based on the probabilistic obstacle position distribution for each obstacle, as applied to the projection of that point or region determined for that obstacle.

13. The computer program product of claim 12, wherein multiple candidate paths are determined as corresponding spacetime tubes, each having a side-surface lying within the spacetime volume and extending from the first spacetime plane to the second spacetime plane, and a risk of collision is estimated for each candidate path, and wherein the risk of collision between the first and second times is computed for each of the candidate paths based on the path-independent function as computed at points or regions on the surface of the corresponding spacetime tube, wherein the path-independent function is independent of the candidate paths and the risk of collision is estimated for each candidate path without recomputing the path-independent function.

14. The computer program product of claim 13, wherein the risk of collision is estimated for the or each candidate path based on an integral of the path-independent function computed over the side-surface of the spacetime tube.

15. The computer program product of claim 14, wherein the path-independent function is a path-independent obstacle tensor field Fcomputed as:

$$F(r, t) = \sum_k F_k(r, t),$$

wherein $F_k(r, t)$ is a tensor component for obstacle k computed based on, $p_k(r_k', T)$ i.e. the probabilistic obstacle position distribution $p_k$ for obstacle k as applied to the projection $(r'_k, T)$ of the point $(r, t)$ on the second spacetime plane, t=T Tbeing the second time.

16. The computer program product of claim 14, wherein the risk of collision is estimated based additionally on a second integral computed over a top-surface of the spacetime tube which lies within the second spacetime plane.

* * * * *